(12) United States Patent
Balk et al.

(10) Patent No.: US 11,807,471 B2
(45) Date of Patent: Nov. 7, 2023

(54) ACCUMULATING CONVEYOR

(71) Applicant: SPECIALTY CONVEYOR B.V., Zwaag (NL)

(72) Inventors: Wouter Balk, Baambrugge (NL); Emiel Martijn Schouten, Amsterdam (NL); Dick Kuin, Wervershoof (NL)

(73) Assignee: SPECIALTY CONVEYOR B.V., Zwaag (NL)

( * ) Notice: Subject to any disclaimer, the term of this patent is extended or adjusted under 35 U.S.C. 154(b) by 87 days.

(21) Appl. No.: 17/598,132

(22) PCT Filed: Mar. 27, 2020

(86) PCT No.: PCT/EP2020/058737
§ 371 (c)(1),
(2) Date: Sep. 24, 2021

(87) PCT Pub. No.: WO2020/201101
PCT Pub. Date: Oct. 8, 2020

(65) Prior Publication Data
US 2022/0194715 A1     Jun. 23, 2022

(30) Foreign Application Priority Data
Mar. 29, 2019   (EP) .................................... 19166225

(51) Int. Cl.
*B65G 47/51*         (2006.01)
*B65G 17/14*         (2006.01)
*B65G 21/18*         (2006.01)

(52) U.S. Cl.
CPC .......... *B65G 47/5118* (2013.01); *B65G 17/14* (2013.01); *B65G 21/18* (2013.01); *B65G 2207/24* (2013.01)

(58) Field of Classification Search
None
See application file for complete search history.

(56) References Cited

U.S. PATENT DOCUMENTS

| 4,653,631 | A | * | 3/1987 | Heybourn | ............... | B65G 21/18 |
| | | | | | | 198/347.3 |
| 5,010,808 | A | * | 4/1991 | Lanham | ................... | A21B 1/48 |
| | | | | | | 34/147 |

(Continued)

FOREIGN PATENT DOCUMENTS

| FR | 2530590 A1 | 1/1984 |
| FR | 2769010 A1 | 4/1999 |

OTHER PUBLICATIONS

International Search Report and Written Opinion for corresponding International Application No. PCT/EP2020/058737 dated Jun. 19, 2020.

*Primary Examiner* — Kavel Singh
(74) *Attorney, Agent, or Firm* — Steven M. Koehler; Westman, Champlin & Koehler, P.A.

(57) ABSTRACT

An accumulating conveyor comprises a conveyor belt successively follows a first helical track from a lower end thereof in upward direction to a location below an upper end thereof, a first bridge to a location at a second helical track below an upper end thereof, the second helical track in downward direction to a lower end thereof, a first set of auxiliary guides to the upper end of the second helical track, the second helical track in downward direction, a second bridge to the first helical track, the first helical track in upward direction to the upper end thereof, and the second set of auxiliary guides to the lower end of the first helical track. The bridges are synchronously movable along the first and second helical tracks for varying the effective lengths of the conveyor belt.

15 Claims, 17 Drawing Sheets

(56) References Cited

U.S. PATENT DOCUMENTS

| | | | | |
|---|---|---|---|---|
| 5,413,213 A | * | 5/1995 | Golz | B65G 47/5131 |
| | | | | 198/778 |
| 5,490,589 A | | 2/1996 | Golz et al. | |
| 8,028,820 B2 | * | 10/2011 | Giehrl | B65G 17/44 |
| | | | | 198/594 |
| 8,770,376 B2 | * | 7/2014 | Takens | B65G 47/5131 |
| | | | | 198/594 |
| 9,688,482 B2 | * | 6/2017 | Beesley | B65G 47/69 |
| 2002/0197363 A1 | | 12/2002 | Shefet et al. | |
| 2011/0180373 A1 | * | 7/2011 | Broers | B65G 47/5131 |
| | | | | 198/607 |

\* cited by examiner

ACCUMULATING CONVEYOR

CROSS-REFERENCE TO RELATED APPLICATION(S)

This Application is a Section 371 National Stage Application of International Application No. PCT/EP2020/058737, filed Mar. 27, 2020 and published as WO 2020/201101 A1 on Oct. 8, 2020, and further claims priority to European Application Ser. No. 19166225.3, filed Mar. 29, 2019.

BACKGROUND

The present invention relates to an accumulating conveyor, comprising a first helical track and a second helical track including coincident centerlines, a first S-shaped bridge and a second S-shaped bridge, each having a first bend in one direction and a second bend in opposite direction as seen from above, a first set of auxiliary guides and a second set of auxiliary guides and an endless conveyor belt which is drivable in a direction of conveyance, wherein the conveyor belt is guidable by the first and second helical tracks, bridges and sets of auxiliary guides such that under operating conditions the conveyor belt successively follows the first helical track from a lower end thereof in upward direction to a location below an upper end thereof, the first bridge to a location at the second helical track below an upper end thereof, the second helical track in downward direction to a lower end thereof, the first set of auxiliary guides to the upper end of the second helical track, the second helical track in downward direction, the second bridge to the first helical track, the first helical track in upward direction to the upper end thereof, and the second set of auxiliary guides to the lower end of the first helical track, wherein the bridges are at least partly located at a common inner side of the first and second helical tracks and synchronously movable along the first and second helical tracks for varying the effective lengths of the conveyor belt between the lower ends of the first and second helical tracks via the first bridge, on the one hand, and between the upper ends of the first and second helical tracks via the second bridge, on the other hand.

Such an accumulating conveyor is known from U.S. Pat. No. 5,413,213. The known accumulating conveyor is used for transporting a mass flow of rod-shaped articles from a first station at the lower end of the first helical conveyor to a remote second station at the lower end of the second helical conveyor via the first bridge. Since the effective length of the conveyor belt between the lower ends of the first and second helical tracks can be varied the conveyor can be applied as a variable-capacity first-in first-out reservoir. At bridge entrances of the respective bridges the conveyor belt is lifted off the helical tracks and at bridge exits of the respective bridges the conveyor belt is put down on the helical tracks. Furthermore, the first and second bends of the bridges are sharper than the bends of the first and second helical tracks. In order to prevent products from tilting on the conveyor belt due to centrifugal forces during travelling along the first bridge the maximum speed of the conveyor belt of the known accumulating conveyor is limited.

SUMMARY

An accumulating conveyor comprises a first helical track and a second helical track including coincident centerlines, a first S-shaped bridge and a second S-shaped bridge, each having a first bend in one direction and a second bend in opposite direction as seen from above, a first set of auxiliary guides and a second set of auxiliary guides and an endless conveyor belt which is drivable in a direction of conveyance. The conveyor belt is guidable by the first and second helical tracks, bridges and sets of auxiliary guides such that under operating conditions the conveyor belt successively follows the first helical track from a lower end thereof in upward direction to a location below an upper end thereof, the first bridge to a location at the second helical track below an upper end thereof, the second helical track in downward direction to a lower end thereof, the first set of auxiliary guides to the upper end of the second helical track, the second helical track in downward direction, the second bridge to the first helical track, the first helical track in upward direction to the upper end thereof, and the second set of auxiliary guides to the lower end of the first helical track. The bridges are at least partly located at a common inner side of the first and second helical tracks and synchronously movable along the first and second helical tracks for varying the effective lengths of the conveyor belt between the lower ends of the first and second helical tracks via the first bridge, on the one hand, and between the upper ends of the first and second helical tracks via the second bridge, on the other hand. At least portions of the first and second bends of at least one of the first and second bridges bank to their insides, which allows a relatively high conveying speed with minimized risk of tilting products that are transported by the conveyor belt.

The first and second sets of auxiliary guides may comprise non-helical tracks, for example straight or curved tracks, and/or rollers, sprockets and the like for guiding the conveyor belt outside the first and second helical tracks.

The conveyor belt may comprise a drivable flexible conveyor line and slats which are mounted to the conveyor line. The conveyor line may be a side-bow chain. Each of the slats may be provided with two guide rollers at a distance from each other in transverse direction of the conveyor belt, wherein the guide rollers run along cooperating rails.

The first and second bridges may be fixed to each other such that the first bridge and second bridge are synchronously displaced upon driving only one of the bridges. Driving only one of the bridges may be performed by the conveyor belt by creating a traction difference in the conveyor belt upstream and downstream of one of the first and second bridges. The first and second bridges may be coupled to each other in a flexible way such that they are movable with respect to each other in a direction along the first and second helical tracks, for example by means of a spring, in order to maintain tension in the conveyor belt. This feature may also be applied to an accumulating conveyor which does not have banking first and second bends at the first and/or second bridges.

The accumulating conveyor may be provided with motors for driving the conveyor belt. For example, a first motor may be located at or close to the lower end of the first helical track and a second motor may be located at or close to the lower end of the second helical track. If both motors are operated at the same speed the first and second bridges stand still with respect to the first and second helical tracks and the effective length of the conveyor belt between the lower ends of the first and second helical tracks via the first bridge remains the same and the effective length of the conveyor belt between the upper ends of the first and second helical tracks via the second bridge remains the same. If only the first motor is operated, the conveyor belt does not move at the lower end of the second helical track and the first motor will pull the first and second bridges upwardly by means of the conveyor belt, hence increasing the effective length of the conveyor belt between the lower ends of the first and second helical tracks via the first bridge. In this case, products can be supplied to the accumulating conveyor at the lower end of the first helical track for temporarily storing them, but no products will leave the accumulating conveyor at the lower end of the second helical track. Similarly, the effective length of the conveyor belt between the upper ends of the first and second helical tracks via the second bridge decreases. If products are stored between the upper ends of the first and second helical tracks via the second bridge, products can leave the upper end of the first helical track whereas no products can be supplied to the upper end of the second helical track.

If only the second motor is operated, the conveyor belt does not move at the lower end of the first helical track and the second motor will pull the first and second bridges downwardly by means of the conveyor belt, hence decreasing the effective length of the conveyor belt between the lower ends of the first and second helical tracks via the first bridge. In this case, no products can be supplied to the accumulating conveyor at the lower end of the first helical track, but stored products can leave the accumulating conveyor at the lower end of the second helical track. Similarly, the effective length of the conveyor belt between the upper ends of the first and second helical tracks via the second bridge increases. Products can be supplied to the upper end of the second helical track, but no products will leave the upper end of the first helical track.

In a particular embodiment the first and second helical tracks surround each other such that the first and second helical tracks extend next to each other in radial direction with respect to their centerlines. In an alternative embodiment the first and second helical tracks extend parallel to each other and are located above each other such that they lie on a common imaginary cylinder and together follow a common helical path. In the latter case, the first and second helical tracks are nested into each other.

In a specific embodiment at least one of the first and second bridges has a first curved section which has a less steeper longitudinal inclination in the direction of conveyance and a smaller radius as seen from above than a second curved section thereof. When a product is transported across the first or second bridge centrifugal forces will act on the product at the first and second curved sections. It appears that a decreasing steepness of the longitudinal inclination in the direction of conveyance allows a higher centrifugal force, in particular for products having a circular bottom. The first curved section has a less steeper longitudinal inclination which allows a relatively high conveying speed which in turn provides the opportunity to apply a relatively small radius. On the other hand, the second curved section which has a steeper longitudinal inclination does not allow a relatively high conveying speed, but due to its relatively large radius a relatively high conveying speed can be achieved.

In case that the first and second helical tracks surround each other such that the first and second helical tracks extend next to each other in radial direction with respect to their centerlines, the first curved section may extend at least partially above neighbouring portions of the first and second helical tracks. For example, if the first helical track surrounds the second helical track, the first bridge lifts the conveyor belt off the first helical track and guides it over neighbouring portions of the first and second helical tracks towards the inner side of the second helical track and from there further towards the second helical track.

In order to avoid loss of height between the conveyor belt at the neighbouring portions where the first bridge lies above the first and second helical tracks, on the one hand, and neighbouring windings of the first and second helical tracks above that location of the first bridge, on the other hand, the longitudinal inclination in the direction of conveyance is preferably small at that location. This allows a relatively small radius and for that reason the first curved section is located there.

In a more particular embodiment the first bend of the at least one of the first and second bridges comprises the first curved section and the second curved section, whereas at least a portion of the second bend has a radius which is the same as the radius of the second curved section. In this case, roughly less than a quarter of the length of the at least one of the first and second bridges may have a smallest first radius whereas more than three quarters of its length may have a smallest second radius which is larger than the smallest first radius.

The second bend may be located downstream of the first bend, which means that the first helical track surrounds the second helical track such that the first curved section lies above the neighbouring portions of the first and second helical tracks.

The banking angle may vary along the first and/or second bridges and preferably develops gradually. The first and the second helical tracks may also bank to their insides.

Since the radius of the first and second helical tracks is larger than any curved section within the first and second bridges, the largest banking angle of the first curved section is preferably larger than the banking angle of the first and second helical tracks.

In an advantageous embodiment the conveyor is provided with a coupling between respective portions of the conveyor belt at the first bridge and the second bridge for transferring a driving force between the respective portions of the conveyor belt at the respective first and second bridges. Such a coupling may be a sprocket which engages a chain of the conveyor belt, for example. In particular when the bridges are located at a relatively high or low level in the accumulating conveyor there may be a great difference in number of windings below the first bridge and above the second bridge along which the conveyor belt travels, such that actual traction in the conveyor belt at the respective bridges may vary significantly when the conveyor belt is pulled at locations downstream of the first bridge and/or downstream of the second bridge. The coupling serves to drive the portion of the conveyor belt at one of the bridges where the actual traction is relatively high by the portion of the conveyor belt at the other bridge where the traction is relatively low if no coupling was applied.

At least one of the first and second bridges may be radially supported by at least one of the first and second helical tracks through at least a bridge roller which is provided at the at least one of the first and second bridges wherein the bridge roller rides on the at least one of the first and second helical tracks. The bridge roller minimizes friction between the cooperating bridge and helical track, whereas no separate supporting track for guiding the bridge roller needs to be applied. If the conveyor belt comprises slats including guide rollers, the bridge roller of the at least one of the first and second bridge may run on the same surface of the at least one of the first and second helical tracks as the guide rollers.

Preferably, the bridge roller is located at at least one of a bridge entrance and a bridge exit of the at least one of the first and second bridges, since radial forces between the cooperating bridge and helical track at the ends of the bridge upon driving the conveyor belt are relatively high.

In a particular embodiment the first and second helical tracks each comprise an inner rail and an outer rail for guiding the conveyor belt, wherein the inner and the outer rails are supported by a helical plate. A helical plate appears to form a rigid support, even in case of a relatively thin plate. An advantage of applying a helical plate is that it takes a small height in comparison to conventional supporting arms, which extend radially with respect to a centerline of a helical track at different heights and at different angles about the centerline.

In another particular embodiment the first and second bridges are coupled to each other through at least an elongate curved coupling element extending along at least one of the first and second helical tracks between the first and second bridges, and/or two remote portions of at least one of the first and second bridges are fixed to another elongate curved coupling element extending along one of the first and second helical tracks between the two remote portions. In this case the space at the first and second helical tracks near the first and second bridges is used to locate the coupling element or the other coupling element.

At least one of the elongate curved coupling element and the other elongate curved coupling element may be flexible and guided by the corresponding one of the first and helical track. This is advantageous since the first and/or helical track is not only used for guiding the conveyor belt, but also for guiding the coupling element(s) between the first and second bridges, on the one hand, and the coupling elements between remote portions of each of the first and second bridges. The flexible coupling element(s) may comprise chain(s).

In a particular embodiment each of the first and second helical tracks is provided with an inner rail and an outer rail surrounding the inner rail, wherein the conveyor belt is upwardly, downwardly and radially supported by the inner rail and upwardly supported by the outer rail and movable in upward direction with respect to the outer rail, wherein the accumulating conveyor is provided with a protection carriage which is freely movable along at least one of the first helical track and the second helical track between the upper end thereof and a stop element at a distance of the upper end thereof, wherein the protection carriage comprises a holding member located above the conveyor belt at the protection carriage for minimizing lifting of the conveyor belt from the outer rail, wherein the second bridge and the protection carriage are provided with cooperating engagement elements which are adapted such that the second bridge can push the protection carriage upwardly along the at least one of the first and second helical tracks. The conveyor belt is not pushed downwardly by the outer rail in order to provide a possibility to lift the conveyor belt off the helical tracks, for example by moving it in outward direction such that it is still upwardly supported by the outer rail, but no longer obstructed in upward direction at the inner rail. However, this might introduce a risk of tilting of the conveyor belt about the inner rail, for example in case of excessive traction in the conveyor belt. The distance between the upper end of the at least one of the first and second helical tracks and the stop element may be a half winding of the corresponding helical track, for example. In case of derailment of the conveyor belt at an upper side of the accumulating conveyor between the upper end of the corresponding helical track and the protection carriage where the level of traction is highest, the derailment will stop at the protection carriage that is located a half winding from the upper end. If a larger effective length of the conveyor belt between the lower ends of the first and second helical tracks via the first bridge is required, the second bridge can move the protection carriage forwardly from the stop element in upward direction.

In another particular embodiment each of the helical tracks is provided with an inner rail and an outer rail surrounding the inner rail, wherein the conveyor belt is provided with slats that are mounted to a flexible conveyor line, such as a side-bow chain, wherein each of the slats is provided with two guide rollers at a distance from each other in transverse direction of the conveyor belt and each guide roller having an axis of rotation including a vertical component, wherein one of the guide rollers of each slat is upwardly, downwardly and radially supported by the inner rails and wherein a portion of each slat is upwardly supported by the outer rails and movable in upward direction with respect to the outer rails, wherein an upper contact location between each of the guide rollers and the inner rails where the guide roller is radially supported lies above a line along which a resultant radial force of the conveyor line towards the centerlines of the first and second helical tracks acts at that slat. This means that the tendency of tilting is minimized.

In another particular embodiment the conveyor belt comprises slats that are mounted to a flexible conveyor line, such as a side-bow chain, wherein each of the slats is provided with two guide rollers at a distance from each other in transverse direction of the conveyor belt and each having an axis of rotation including a vertical component, wherein the first and second bridges are each provided with inner and outer guides for guiding the respective guide rollers, wherein each of the inner and outer guides has a trough-shape including a lower sidewall, an upper sidewall and a bottom between the lower and upper sidewalls, wherein the lower and upper sidewalls diverge as seen from the bottom, wherein at least one of the lower and upper sidewalls has a diverging angle with respect to the bottom which is smaller than 100°. This is a relatively small angle, which prevents the conveyor belt from undesired additional banking in case the conveyor belt shifts in its transverse direction with respect to the inner and outer guides. Such a shift may happen during a period of low traction in the conveyor belt at a certain location along at least one of the first and second bridges.

BRIEF DESCRIPTION OF THE DRAWINGS

Aspects of the invention will hereafter be elucidated with reference to very schematic drawings showing embodiments of the invention by way of example.

DETAILED DESCRIPTION OF THE ILLUSTRATIVE EMBODIMENTS

Figure 1:
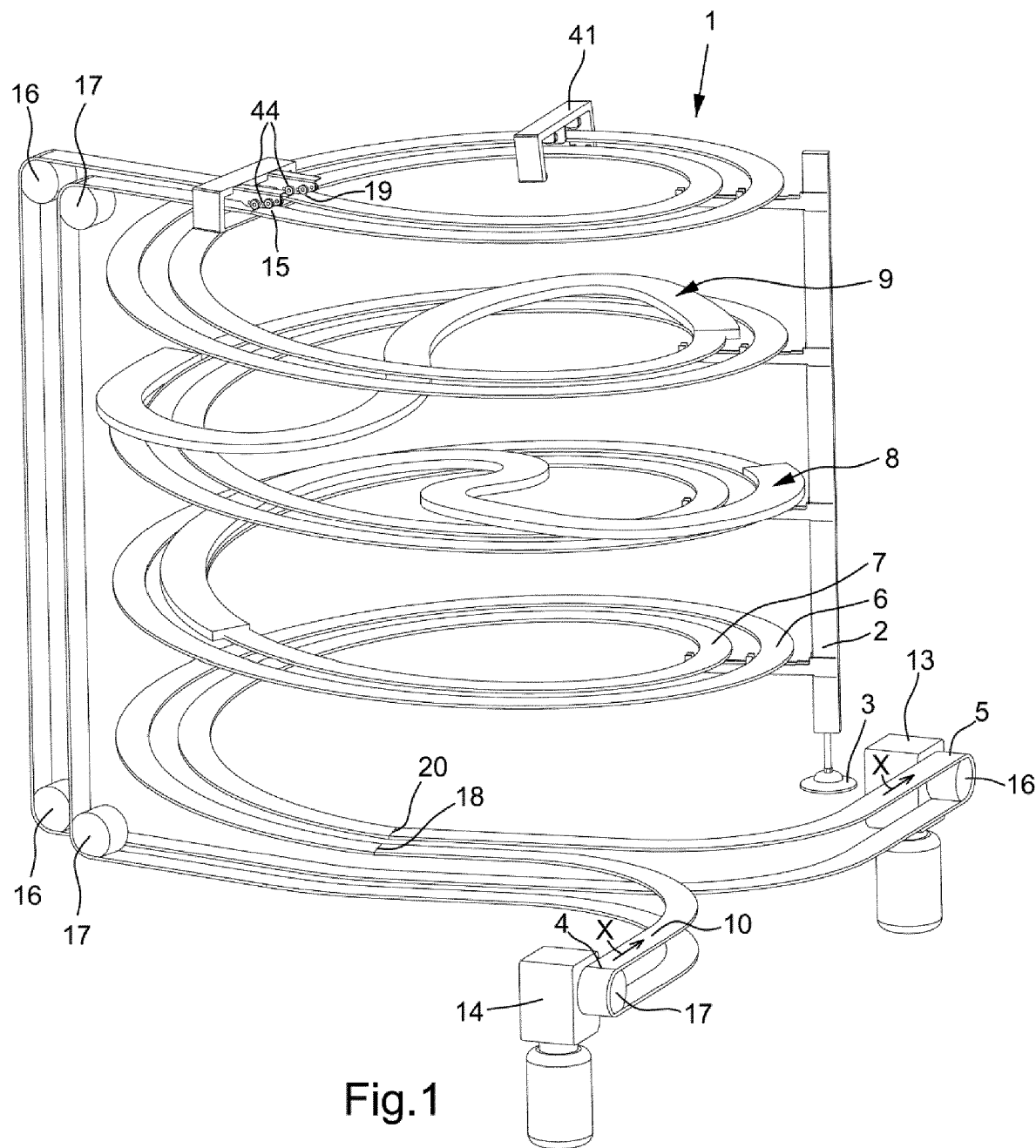
FIG. 1 is a perspective view of an embodiment of an accumulating conveyor.
Figure 2:
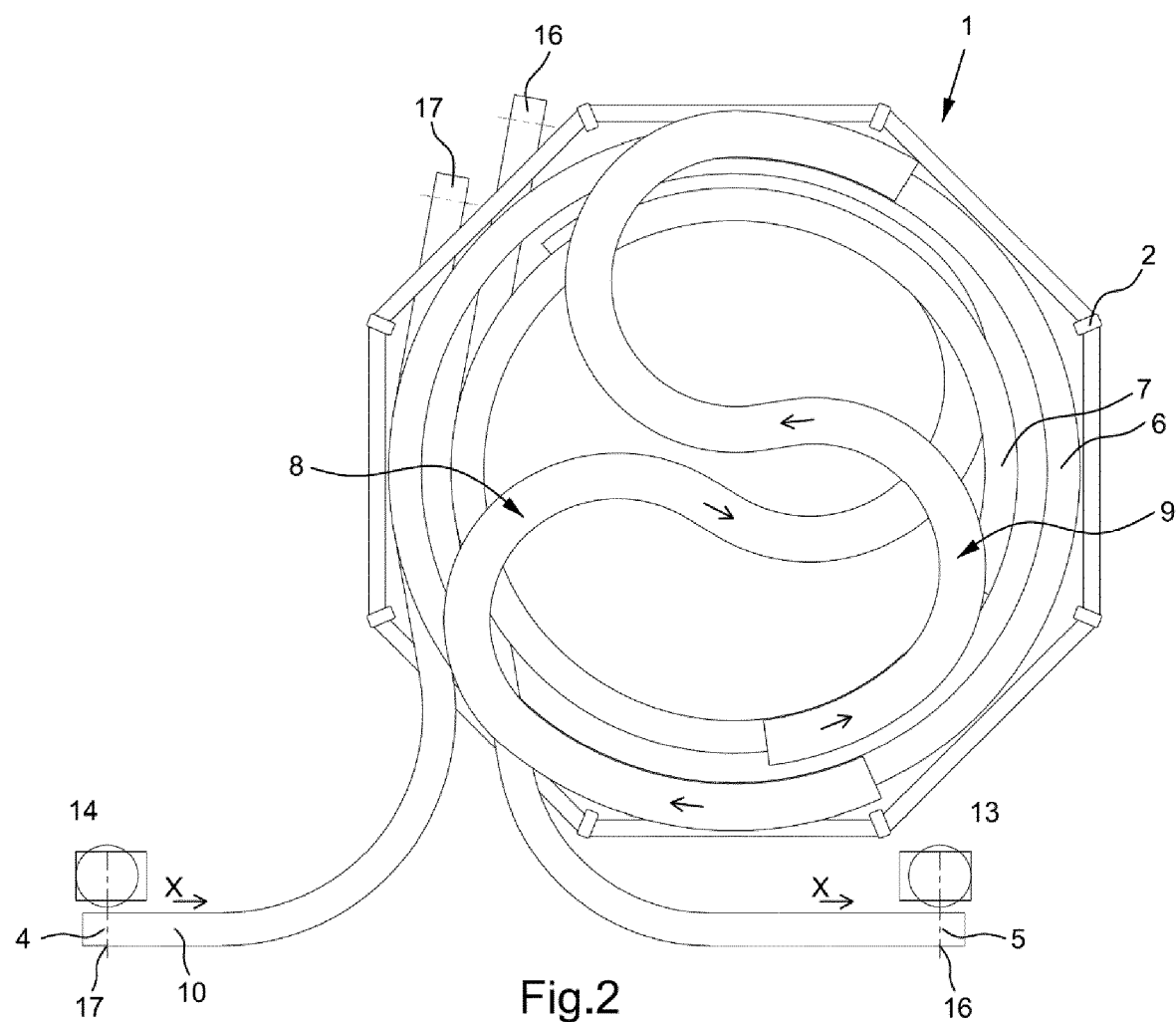
FIG. 2 is a cross-sectional view of the embodiment as shown in FIG. 1, as seen from above.

FIGS. 1 and 2 show an embodiment of an accumulating conveyor 1. The accumulating conveyor 1 has a frame 2 including feet 3 which rest on a floor. The accumulating conveyor 1 has a product inlet 4 where products are received from a supply (not shown), for example a supplying machine, and a product outlet 5 where products are discharged, for example to a receiving machine (not shown). The accumulating conveyor 1 is suitable for temporarily storing products between the product inlet 4 and the product outlet 5. For example, in the event that the supply keeps on supplying products to the product inlet 4 whereas a receiving machine downstream of the product outlet 5 is temporarily out of order the products can be stored. This may prevent a production line from entirely stopping.

The frame 2 supports a first helical track in the form of an outer helical track 6 and a second helical track in the form of an inner helical track 7. The outer helical track 6 surrounds the inner helical track 7. The inner and outer helical tracks 6, 7 are arranged concentrically with respect to each other. In other words, their centerlines coincide. The accumulating conveyor 1 is further provided with a first S-shaped bridge in the form of a lower S-shaped bridge 8 and a second S-shaped bridge in the form of an upper S-shaped bridge 9 located above the lower bridge 8. The upper and lower bridges 8, 9 are coupled to each other and synchronously movable along the inner and outer helical tracks 6, 7.

The accumulating conveyor 1 has a single endless conveyor belt 10, in this case a slat belt which comprises slats 11 that are mounted to a chain 12 which is flexible in horizontal and vertical direction, for example a side-bow chain. The chain 12 is driven by two electric motors 13, 14, one of them located at the product inlet 4 and the other one located at the product outlet 5. Other locations are, however, conceivable. The conveyor belt 10 is guided by the inner and outer helical tracks 6, 7, the upper and lower bridges 8, 9, a first set of auxiliary guides in the form of a first series of wheels or sprockets 16 and non-helical tracks and a second set of auxiliary guides in the form of a second series of wheels or sprockets 17 and non-helical tracks.

Under operating conditions the conveyor belt 10 moves in a direction of conveyance X from the product inlet 4 via a horizontal track to a lower end 18 of the outer helical track 6 and then in upward direction along the outer helical track 6 until it reaches the lower bridge 8. Subsequently, the conveyor belt 10 moves via the lower bridge 8 to the inner helical track 7 to a location below an upper end 19 thereof and then in downward direction along the inner helical track 7. At a lower end 20 of the inner helical track 7 the conveyor belt 10 leaves the inner helical track 7 and moves via a horizontal track to a sprocket 16 at the product outlet 5 of the accumulating conveyor 1. The path of the conveyor belt 10 between the product inlet 4 and the product outlet 5 forms an accumulation region which supports and conveys products. The length of the accumulation region can be varied by displacing the upper and lower bridges 8, 9 along the inner and outer helical tracks 6, 7.

Outside the accumulation region the conveyor belt 10 has an unoccupied region between the product outlet 5 and the product inlet 4. The unoccupied region does not support and convey products, but returns the conveyor belt 10 from the product outlet 5 back to the product inlet 4 via the upper bridge 9. Its length varies inversely with the length of the accumulation region. From the sprocket 16 at the product outlet 5 the conveyor belt 10 moves upside down along a horizontal track to the sprocket 16 at a lower side of the inner and outer helical tracks 6, 7 which sprocket 16 directs the conveyor belt 10 upwardly at the outer side of the outer helical track 6 whereas the sprocket 16 at the upper end 19 of the inner helical track 7 directs the conveyor belt 10 to the inner helical track 7. Then, the conveyor belt 10 moves downwardly along the inner helical track 7 until the upper bridge 9 is reached. The upper bridge 9 guides the conveyor belt 10 to the outer helical track 6 which guides the conveyor belt 10 in upward direction to the sprocket 17 at the upper end 15 of the outer helical track 6 which sprocket 17 directs the conveyor belt 10 downwardly at the outer side of the outer helical track 6. The sprocket 17 at a lower side of the outer helical track 6 diverts the conveyor belt 10 to a horizontal track towards the sprocket 17 at the product inlet 4.

The lower and upper bridges 8, 9 are indirectly displaced along the inner and outer helical tracks 6, 1 by both motors 13, 14. If the motors 13, 14 are operated at the same speed the lower and upper bridges 8, 9 stand still with respect to the inner and outer helical tracks 6, 7. The accumulation region of the conveyor belt 10 remains the same. If only the motor 14 at the product inlet 4 is operated, the conveyor belt 10 does not move at the product outlet 5 and the motor 14 at the product inlet 4 will pull the lower and upper bridges 8, 9 upwardly by means of the conveyor belt 10. As a result, the accumulation region will increase. If only the motor 13 at the product outlet 5 is operated, the conveyor belt 10 does not move at the product inlet 4 and the motor 13 at the product outlet 5 will pull the lower and upper bridges 8, 9 downwardly by means of the conveyor belt 10. As a result, the accumulation region will decrease.

Figure 3:
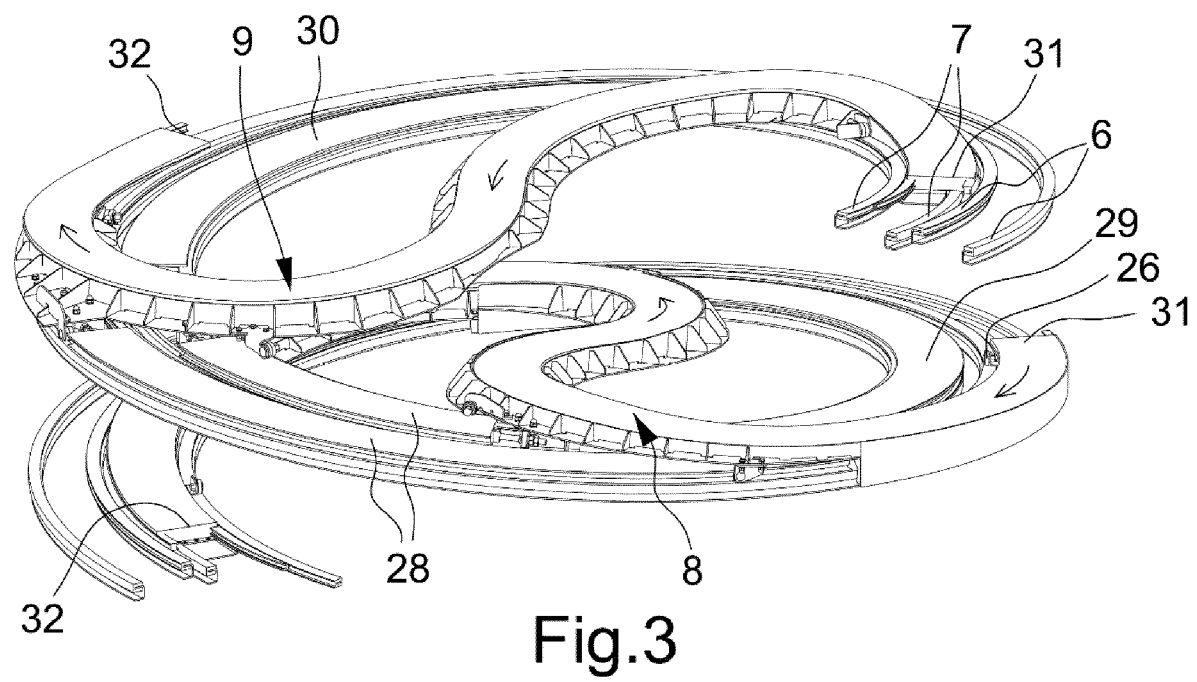
FIG. 3 is a similar view as FIG. 1, but showing a part of the embodiment on a larger scale.

A transfer region between the lower bridge 8 and the inner helical track 7 at a bridge exit 32 is similar as the transfer region between the outer helical track 6 and the lower bridge 8 at a bridge entrance 31, but in reverse order, see FIG. 3. Similarly, transfer regions between the upper bridge 9 and the respective inner and outer helical tracks 6, 7 are similar.

Figure 4:
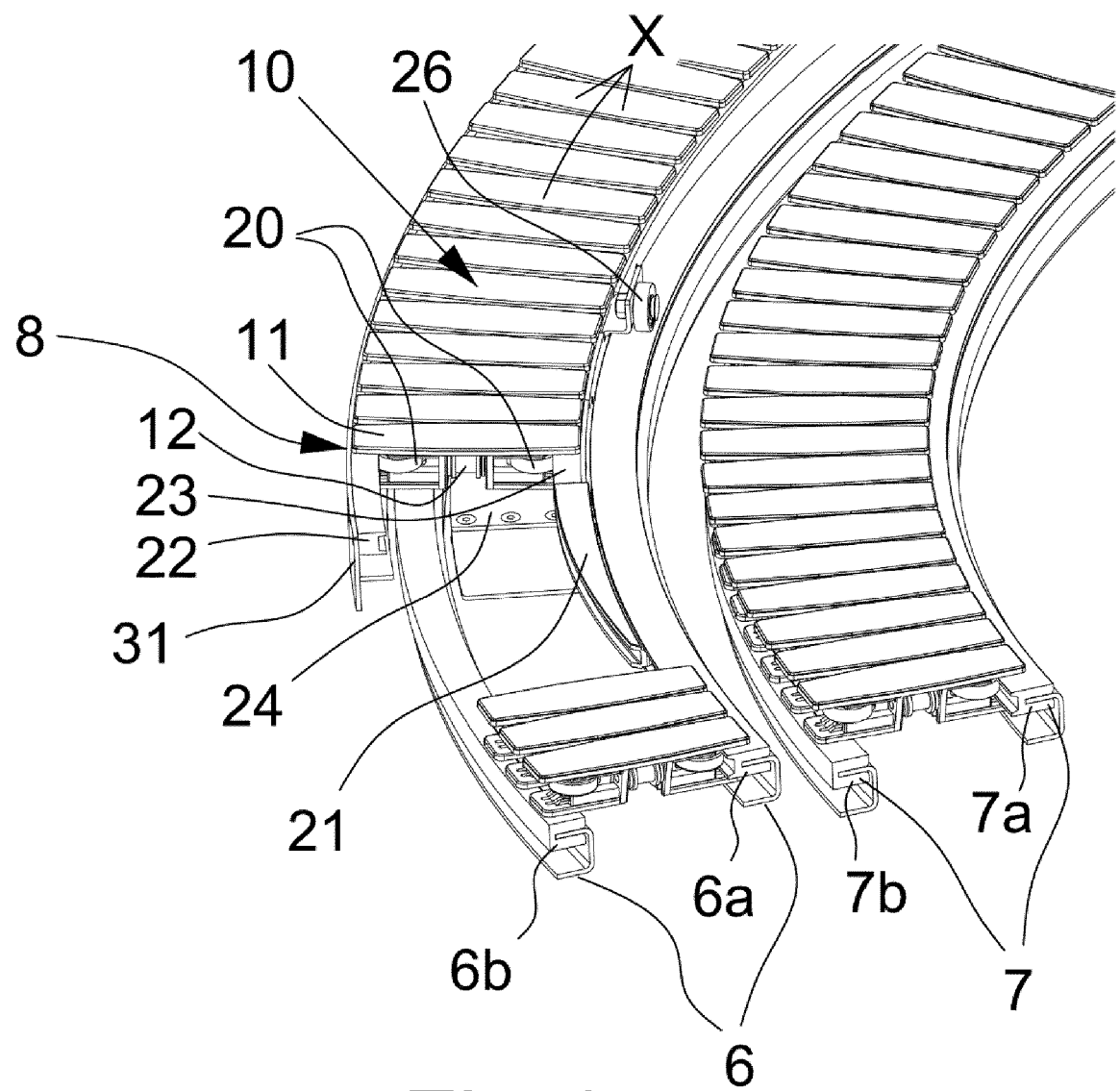
FIG. 4 is a perspective view of a section of a part of the embodiment of FIG. 1.
Figure 5:
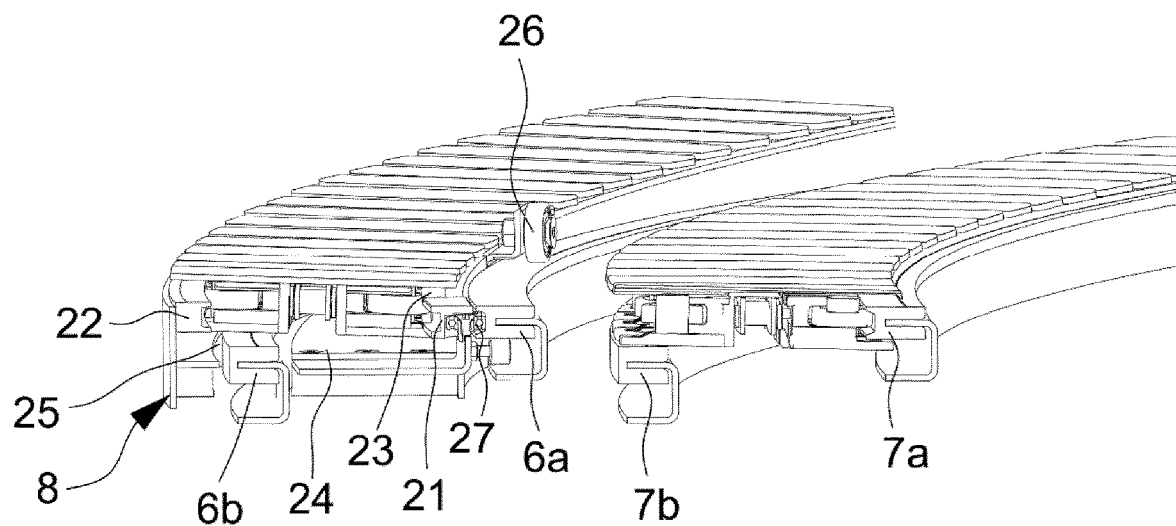
FIG. 5 is a similar view as FIG. 4, but showing a section at a different location.

FIGS. 3-6 show the accumulating conveyor 1 at the upper and lower bridges 8, 9 in more detail. FIGS. 4 and 5 show that the inner and outer helical tracks 6, 7 are similar. Each of them has an inner rail 6a, 7a and an outer rail 6b, 7b. FIG. 4 shows a number of the slats 11 of the conveyor belt 10 at the outer helical track 6. For explanatory reasons a part of the slats 11 are not shown. For the same reason the upper sides of the slats 11 are not shown in FIG. 6. Each slat 11 is provided with two guide rollers 20 at a distance from each other in transverse direction of the conveyor belt 10 and at either side of the chain 12. The guide rollers 20 have axes of rotation including a vertical component and in this case the guide rollers 20 are cylindrical. At the inner and outer helical tracks 6, 7 one of the guide rollers 20 of each slat 11 is supported in radial direction with respect to the centerlines of the inner and outer helical tracks 6, 1, in upward direction and in downward direction by the inner rails 6a, 7a. For this reason the inner rails 6a, 7a have a trough shape. The outer rails 6b, 7b support the slats 11 in upward direction only through sliding bottom surfaces of the slats 11 which slide on upper surfaces of the outer rails 6b, 7b under operating conditions. The sliding bottom surfaces are lower sides of respective feet of the slats 11 on which the guide rollers are rotatably mounted. Because of the height difference between the guide rollers 20 and the sliding bottom surfaces of the slats 11 the outer rail 6b, 7b is located lower than the inner rail 6a, 7a of each of the inner and outer helical tracks 6, 7 as seen in cross-section, see FIG. 5. It is noted that the active one of the two guide rollers 20 of each slat 11 depends on the actual location of the slat 11 within the accumulating conveyor 1. The guide roller 20 that runs along the inner rail 6a of the outer helical track 6 will be at a distance from the inner rail 7a of the inner helical track 7.

Figure 6:
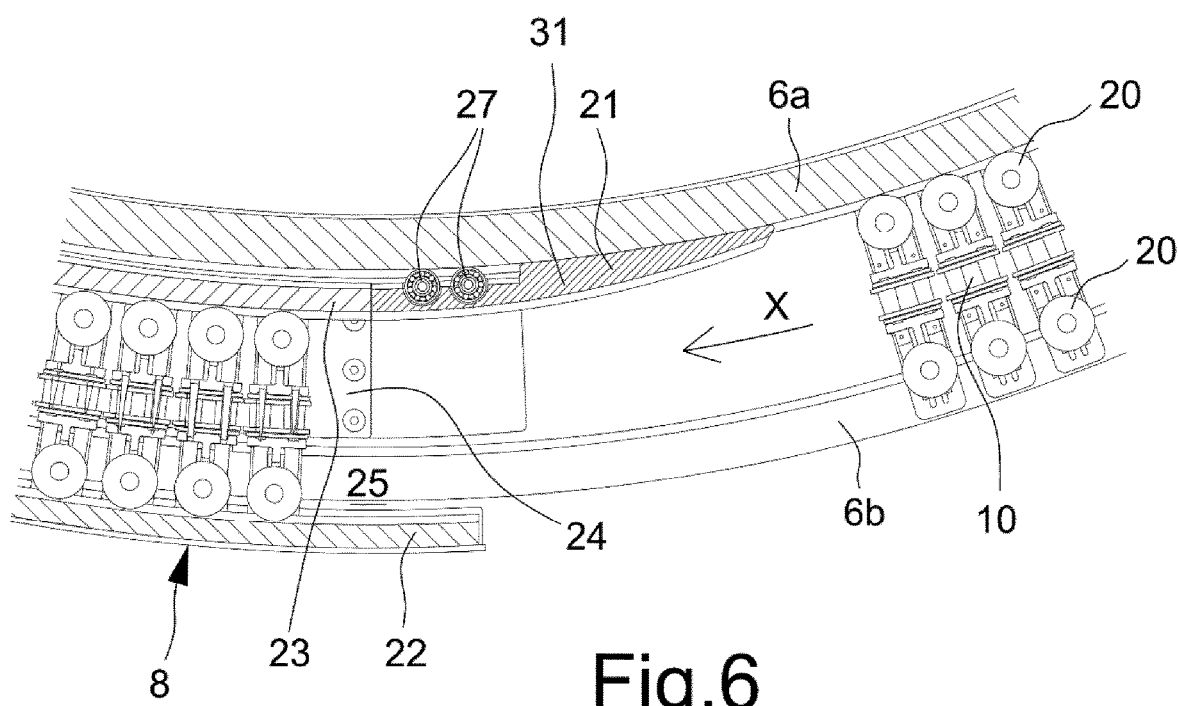
FIG. 6 is a plan view of a part of FIG. 4 on a larger scale.

FIGS. 4-6 show a transfer region between the outer helical track 6 and the lower bridge 8 at the bridge entrance 31 in more detail. The lower bridge 8 is provided with a diverter 21 which guides the slats 11 in outward direction by guiding one of the guide rollers 20 through a trough profile which is similar as the trough profile at the inner rails 6a, 7a. During a first phase of diverting the slats 11 they are upwardly supported by the trough profile of the diverter 21, on the one hand, and by the outer rail 6b on which the slats 11 slide in outward direction, on the other hand. In a next phase of diverting the slats 11 the guide roller 20 at the outer rail 6b is received by an outer guide 22 of the lower bridge 8, whereas the other guide roller 20 is received by an inner guide 23 of the lower bridge 8. Subsequently, the slats 11 follow a path that is dictated by the inner and outer guides 22, 23 of the lower bridge 8. Both the inner and outer guides 22, 23 are trough-shaped. The lower bridge 8 has a bottom plate 24 to which the inner and outer guides 22, 23 are mounted and which has a cut-out 25 for providing space for the outer rail 6b.

It will be clear to the skilled person that the inner guide 23 at one bend of the S-shape of the lower bridge 8 in fact forms the outer guide 22 at the opposite bend, and that the outer guide 22 at the one bend in fact forms the inner guide 23 of the opposite bend.

FIGS. 3-5 show that the lower bridge 8 is upwardly supported and guided by the outer helical track 6 through at least a wheel 26 which runs on an upper surface of the inner rail 6a. The lower bridge 8 is also supported in outward radial direction with respect to the centerline of the outer helical track 6 through bridge rollers 27 which run along the inner rail 6a of the outer helical track 6. FIGS. 5 and 6 show that the bridge rollers 27 are provided at the diverter 21 and run along the inner rail 6a of the outer helical track 6, on the same surface as the guide rollers 20 of the slats 11 of the conveyor belt 10.

The application of the wheel 26 and bridge rollers 27 is not limited to the lower bridge 8, but can also be applied at the upper bridge 9. The application of the bridge rollers 27 is neither necessarily related to other aspects as described in the present application. In other words, the invention is also related to the following aspects:

Aspect 1: An accumulating conveyor, comprising a first helical track and a second helical track including coincident centerlines, a first S-shaped bridge and a second S-shaped bridge, each having a first bend in one direction and a second bend in opposite direction as seen from above, a first set of auxiliary guides and a second set of auxiliary guides and an endless conveyor belt which is drivable in a direction of conveyance, wherein the conveyor belt is guidable by said first and second helical tracks, bridges and sets of auxiliary guides such that under operating conditions the conveyor belt successively follows the first helical track from a lower end thereof in upward direction to a location below an upper end thereof, the first bridge to a location at the second helical track below an upper end thereof, the second helical track in downward direction to a lower end thereof, the first set of auxiliary guides to the upper end of the second helical track, the second helical track in downward direction, the second bridge to the first helical track, the first helical track in upward direction to the upper end thereof, and the second set of auxiliary guides to the lower end of the first helical track, wherein the bridges are at least partly located at a common inner side of the first and second helical tracks and synchronously movable along the first and second helical tracks for varying the effective lengths of the conveyor belt between the lower ends of the first and second helical tracks via the first bridge, on the one hand, and between the upper ends of the first and second helical tracks via the second bridge, on the other hand, wherein at least one of the first and second bridges is radially supported with respect to the centerlines of the first and second helical tracks by at least one of the first and second helical tracks through at least a bridge roller which has an axis of rotation including a vertical component and which is provided at said at least one of the first and second bridges and which bridge roller rides on said at least one of the first and second helical tracks. Hence, the at least one of the first and second helical tracks guides both the conveyor belt and the bridge roller.

Aspect 2: An accumulating conveyor according to aspect 1, wherein the bridge roller is located at at least one of a bridge entrance and a bridge exit of said at least one of the first and second bridges. This is advantageous since radial forces of the bridges onto the corresponding helical tracks are relatively high due to traction in the conveyor belt.

FIG. 3 shows that the lower bridge 8 and the upper bridge 9 are coupled to each other through chains 28 along the inner and outer helical tracks 6, 7. Furthermore, two remote portions of the lower bridge 8 are fixed to a chain 29 which is movable along the inner helical track 7, whereas two remote portions of the upper bridge 9 are fixed to a chain 30 which is also located at and movable along the inner helical track 7. In FIG. 3 the chains 28, 29, 30 are simply pieces of the same material as the conveyor belt 10, which are guided by the guide rollers 20 of the slats 11 along the inner and outer helical tracks 6, 7, but alternative chains and guides are conceivable.

The application of the chains 28-30 is not necessarily related to other aspects as described in the present application. In other words, the invention is also related to the following aspects:

Aspect 1: An accumulating conveyor, comprising a first helical track and a second helical track including coincident centerlines, a first S-shaped bridge and a second S-shaped bridge, each having a first bend in one direction and a second bend in opposite direction as seen from above, a first set of auxiliary guides and a second set of auxiliary guides and an endless conveyor belt which is drivable in a direction of conveyance, wherein the conveyor belt is guidable by said first and second helical tracks, bridges and sets of auxiliary guides such that under operating conditions the conveyor belt successively follows the first helical track from a lower end thereof in upward direction to a location below an upper end thereof, the first bridge to a location at the second helical track below an upper end thereof, the second helical track in downward direction to a lower end thereof, the first set of auxiliary guides to the upper end of the second helical track, the second helical track in downward direction, the second bridge to the first helical track, the first helical track in upward direction to the upper end thereof, and the second set of auxiliary guides to the lower end of the first helical track, wherein the bridges are at least partly located at a common inner side of the first and second helical tracks and synchronously movable along the first and second helical tracks for varying the effective lengths of the conveyor belt between the lower ends of the first and second helical tracks via the first bridge, on the one hand, and between the upper ends of the first and second helical tracks via the second bridge, on the other hand, wherein the first and second bridges are coupled to each other through at least an elongate curved coupling element extending along at least one of the first and second helical tracks between the first and second bridges, and/or wherein two remote portions of at least one of the first and second bridges are fixed to another elongate curved coupling element extending along one of the first and second helical tracks between said remote portions.

Aspect 2: An accumulating conveyor according to aspect 1, wherein at least one of the elongate curved coupling element and the other elongate curved coupling element is flexible in transverse direction thereof, for example a chain, and guided by the corresponding one of the first and second helical track.

Aspect 3: An accumulating conveyor according to aspect 1 or 2, wherein the first and second bridges are coupled to each other through two elongate curved coupling elements extending along the inner and outer helical tracks, respectively.

Figure 7:
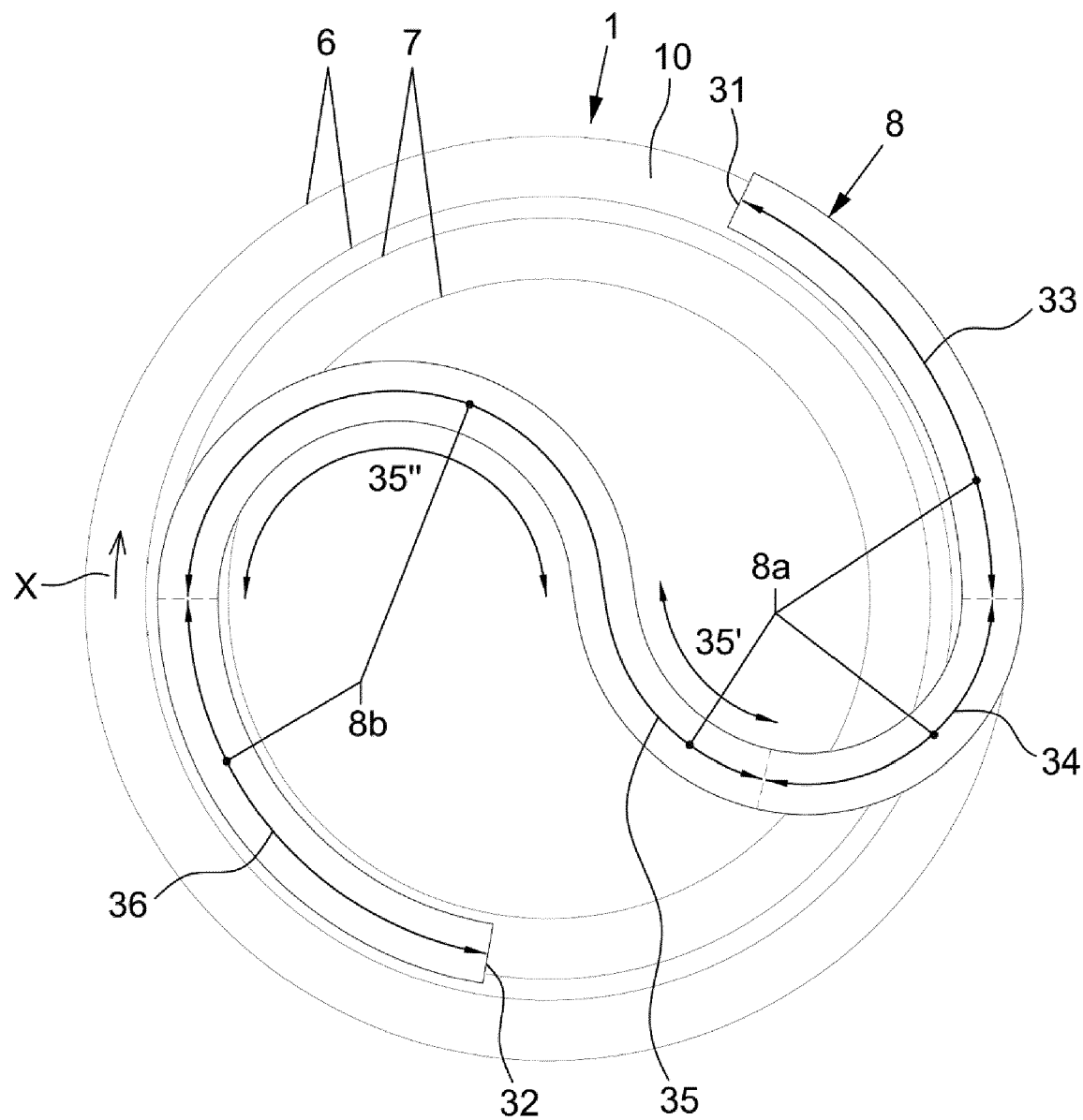
FIG. 7 is an illustrative plan view of the lower bridge.

FIG. 7 illustrates a bridge path which the conveyor belt 10 follows from the outer helical track 6 to the inner helical track 7 via the lower bridge 8 as seen from above. The lower bridge 8 has an S-shaped bridge path including a first bend 8a in one direction or clockwise direction and a second bend 8b in opposite direction or anti-clockwise direction as seen from above. The second bend 8b is located downstream of the first bend 8a in this embodiment. From the bridge entrance 31 to the bridge exit 32 the bridge path can be successively subdivided in a lifting portion 33, a cross-over portion 34, a descending portion 35 and a coupling portion 36. Within the lifting portion 33 the conveyor belt 10 is lifted off the outer helical track 6 as described hereinbefore. The bridge path has a longitudinal inclination angle in the direction of conveyance X in the lifting portion 33, which angle is larger than the longitudinal inclination angle of the outer helical track 6 in the direction of conveyance X. On the other hand, the longitudinal inclination angle within the lifting portion 33 is relatively small, for example the angle of the outer helical track 6 is 4.5° and the maximum angle within the lifting portion 33 is 3-8°.

Within the cross-over portion 34 the bridge path extends over neighboring portions of the inner and outer helical tracks 6, 7. The longitudinal inclination angle within the cross-over portion 34 is still rather small in order to keep the height between the conveyor belt 10 and the neighboring windings of the inner and outer helical track 6, 7 above the cross-over portion 34 as large as possible. The longitudinal inclination angle may be 1-3°, for example.

Within the descending portion 35 and the coupling portion 36 the bridge path runs in downward direction until reaching the inner helical track 7. The longitudinal inclination angle within the descending portion 35 and the coupling portion 36 is relatively large, for example 3-8°. A transfer between the cross-over portion 34 and the descending portion 35 will be close to the inner rail 7a of the inner helical track 1 in practice.

The first bend 8a of the bridge path has a sharpest portion which is sharper than a sharpest portion of the second bend 8b. The sharpest portion of the second bend 8b of the bridge path is a curved section 35" being part of the descending portion 35 and having a radius which is the same as the radius of a curved section 35' within the descending portion 35 that is located in the first bend 8a adjacent to the cross-over portion 34. The mentioned radius in the curved section 35' is larger than the radius of the cross-over portion 34. More specifically, the cross-over portion 34 has a combination of a less steeper longitudinal inclination and a smaller radius as seen from above than each of the lifting portion 33, the coupling portion 36 and the curved sections 35', 35" of the descending portion 35. The cross-over portion 34 can be indicated as the first curved section of the first bridge 8 of the invention, whereas the lifting portion 33, the coupling portion 36 and each of the curved sections 35', 35" of the descending portion 35 can be indicated as the second curved section of the first bridge 8.

Between the first and second bends 8a, 8b the descending portion 35 has a straight section, which has a length larger than zero, for example larger than the width of one slat as measured in the direction of conveyance X. The straight portion appears to be advantageous in terms of stable transportation of products between the first and second bends 8a, 8b.

The application of the relatively small inclination and small radius of the cross-over portion is not necessarily related to other aspects as described in the present application. In other words, the invention is also related to the following aspects:

Aspect 1: An accumulating conveyor, comprising a first helical track and a second helical track including coincident centerlines, a first S-shaped bridge and a second S-shaped bridge, each having a first bend in one direction and a second bend in opposite direction as seen from above, a first set of auxiliary guides and a second set of auxiliary guides and an endless conveyor belt which is drivable in a direction of conveyance, wherein the conveyor belt is guidable by said first and second helical tracks, bridges and sets of auxiliary guides such that under operating conditions the conveyor belt successively follows the first helical track from a lower end thereof in upward direction to a location below an upper end thereof, the first bridge to a location at the second helical track below an upper end thereof, the second helical track in downward direction to a lower end thereof, the first set of auxiliary guides to the upper end of the second helical track, the second helical track in downward direction, the second bridge to the first helical track, the first helical track in upward direction to the upper end thereof, and the second set of auxiliary guides to the lower end of the first helical track, wherein the bridges are at least partly located at a common inner side of the first and second helical tracks and synchronously movable along the first and second helical tracks for varying the effective lengths of the conveyor belt between the lower ends of the first and second helical tracks via the first bridge, on the one hand, and between the upper ends of the first and second helical tracks via the second bridge, on the other hand, wherein each of said bridges has a varying longitudinal inclination in the direction of conveyance along the respective bridges, wherein at least one of the first and second bridges has a first curved section which has a less steeper longitudinal inclination and a smaller radius as seen from above than a second curved section thereof.

Aspect 2: An accumulating conveyor according to aspect 1, wherein the first and second helical tracks surround each other such that the first and second helical tracks extend next to each other in radial direction with respect to their centerlines, or wherein the first and second helical tracks extend parallel to each other and are located above each other such that they lie on a common imaginary cylinder and together follow a common helical path.

Aspect 3: An accumulating conveyor according to aspect 1, wherein the first and second helical tracks surround each other such that the first and second helical tracks extend next to each other in radial direction with respect to their centerlines, wherein the first curved section extends at least partially above neighbouring portions of the first and second helical tracks.

Aspect 4: An accumulating conveyor according to one of the preceding aspects, wherein the first bend of the at least one of the first and second bridges comprises the first curved section and the second curved section, whereas the second bend has a radius which is the same as the radius of the second curved section.

Aspect 5: An accumulating conveyor according to aspect 4, wherein the second bend is located downstream of the first bend.

The inner and outer helical tracks 6, 7 bank to their insides, for example by a banking angle of 1°. The inner and outer guides 22, 23 of the lower bridge 8 also bank to their inside. Within the lifting portion 33 of the lower bridge 8 the banking angle increases, for example from 1° at the bridge entrance 31 up to 5° at the cross-over portion 34. This banking angle is maintained at the cross-over portion 34 and decreases to zero at the straight section halfway the lower bridge 8 and increases again to a higher level from there to a highest level within the second bend 8*b*. The banking angle decreases within the coupling section 36, for example to 1° at the bridge exit 32. It may be clear that the inner and outer guides of the upper bridge 9 may be arranged such that the bends of the upper bridge 9 bank to their insides, as well.

The trough-shaped inner and outer guides 22, 23 of the upper and lower bridges 8, 9 have profiles that are different from the profiles of the trough-shaped inner rails 6*a*, 7*a*. The angle between diverging walls of the trough-shapes of the inner and outer guides 22, 23 of the upper and lower bridges 8, 9 may be 14-20°, for example.

Figure 8:
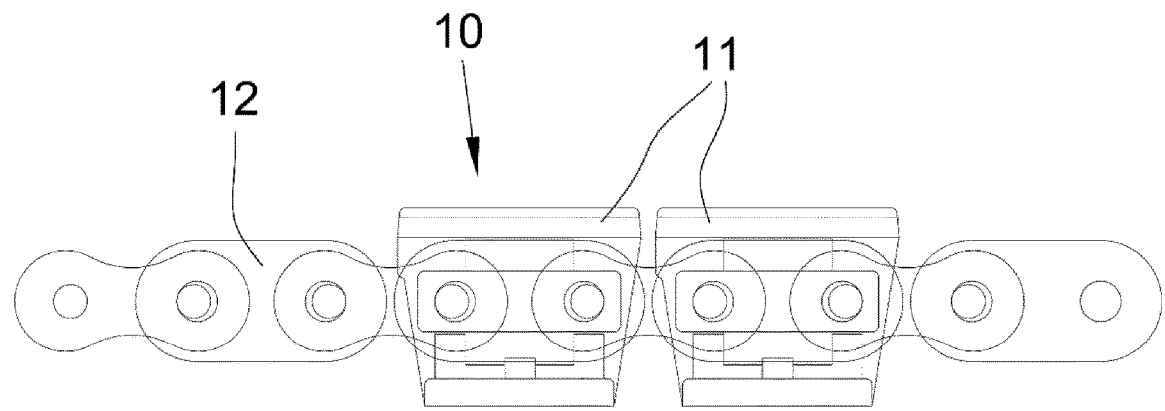
FIG. 8 is a side view of an embodiment of a conveyor belt including two slats.
Figure 9:
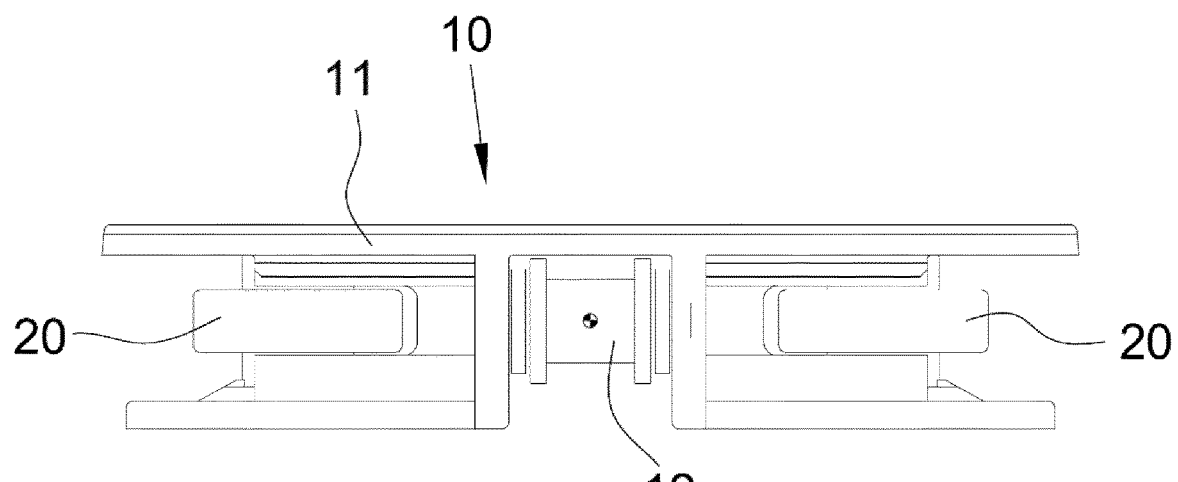
FIG. 9 is a cross-sectional view of the conveyor belt as shown in FIG. 8.
Figure 10:
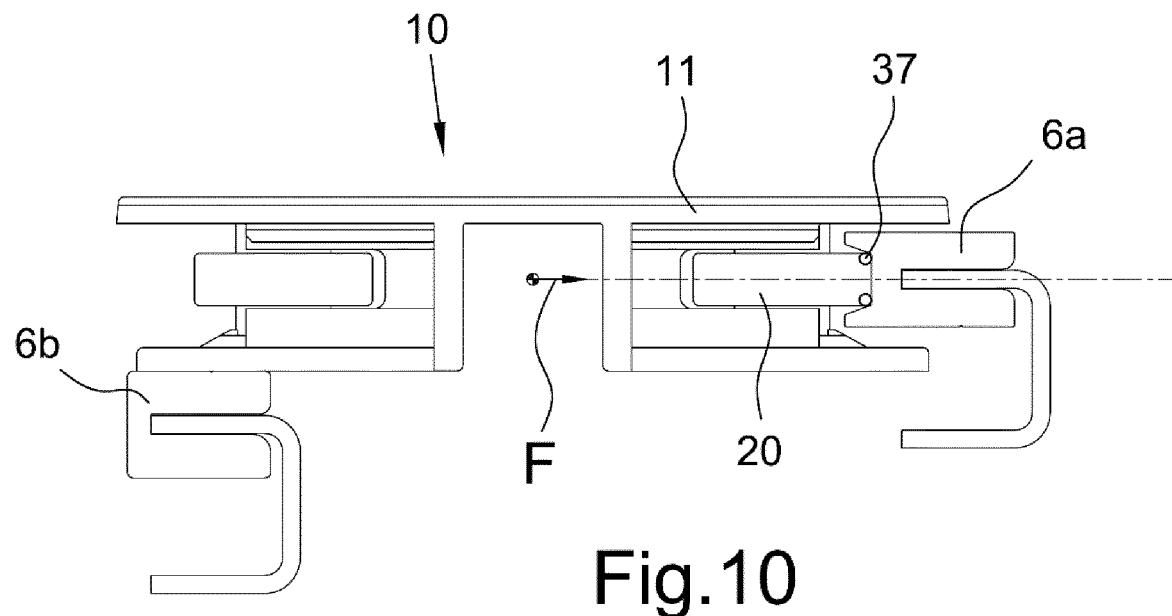
FIG. 10 is a similar view as FIG. 9 in a condition in which the conveyor belt is supported by the helical track.

FIGS. 8 and 9 show the conveyor belt 10 including two slats 11 in more detail; the other slats 11 are not shown for explanatory reasons. Each slat 11 is mounted to a respective link of the chain 12. FIG. 10 shows the slat 11 in a condition in which one of its guide rollers 20 is upwardly, downwardly and radially supported by the inner rail 6*a* of the outer helical track 6 and the slat 11 is also upwardly supported by the outer rail 6*b* of the outer helical track 6. The chain 12 is not shown in FIG. 10 for clarity reasons. Since the slats 11 are only supported upwardly at the outer rail 6*b* there might be a risk of lifting the slats 11 at that location in case of excessive traction in the conveyor belt 10. This might even lead to tilting of the conveyor belt 10 about the inner rail 6*a*. This risk is minimized by the shape and dimensions of the conveyor belt 10 and the inner rail 6*a*, which is illustrated in FIG. 10. Traction in the chain 12 creates a resultant force F in radial direction towards the centerline of the outer helical track 6. In order to avoid tilting, an upper contact location 37 between one of the guide rollers 20 of each slat 11 and the inner rail 6*a* where the guide roller 20 is radially supported must be located above the line along which the resultant radial force F of the chain 12 acts as seen in cross-section of the outer helical track 6, which is illustrated in FIG. 10. The upper contact location 37 may be an upper end of a line contact between the guide roller 20 and the inner rail 6*a*.

It is important to adapt the shapes of the guide rollers 20 and the inner rail 6*a* carefully to each other. For example, a combination of a cylindrical guide roller 20 and an inner rail 6*a* including a convex radial supporting surface should be avoided, since the convexity may lead to an effective upper contact location 37 which lies close to or at the same height level as the line along which the resultant force F acts as seen in cross-section of the helical track 6.

Figure 11:
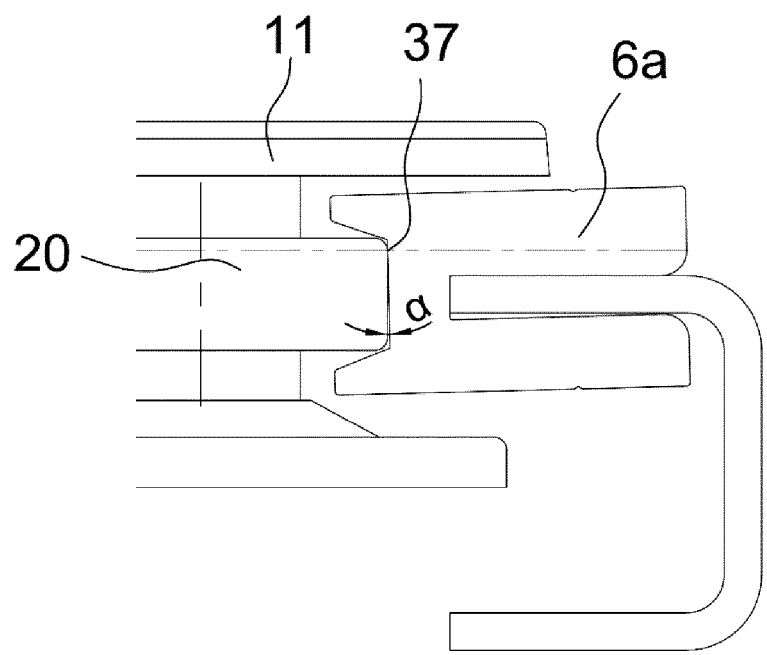
FIG. 11 is a similar view as FIG. 10, but showing a part of an alternative embodiment on a larger scale.

FIG. 11 shows an embodiment in which the inner rail 6*a* is slightly tilted such that the upper contact location 37 between the cylindrical guide roller 20 and the inner rail 6*a* where the guide roller 20 is radially supported lies at a highest possible location. This is indicated by an angle α between opposite surfaces of the guide roller 20 and the inner rail 6*a*. In this case there is a point contact rather than a line contact between the guide roller 20 and the inner rail 6*a*.

The situation related to the inner rail 6*a* as described above also applies to the inner rail 7*a* of the inner helical track 7.

The relationship between the location of the upper contact location and the radial line along which the resultant chain force acts at each slat is not necessarily related to other features of the accumulating conveyor as shown in the figures and described herein. In other words, the invention is also related to the following aspects:

Aspect 1: A conveyor including a helical track and a conveyor belt which is drivable along the helical track, wherein the helical track is provided with an inner rail and an outer rail surrounding the inner rail, wherein the conveyor belt is provided with slats that are mounted to a flexible conveyor line, such as a side-bow chain, wherein each of the slats is provided with a guide roller having an axis of rotation including a vertical component, which guide roller is upwardly, downwardly and radially supported by the inner rail and wherein each of the slats is upwardly supported by the outer rail and movable in upward direction with respect to the outer rail, wherein an upper contact location between the guide roller and the inner rail where the guide roller is radially supported lies above a line along which a resultant radial force of the conveyor line towards a centerline of the inner rail acts. The guide roller is radially supported by the inner rail in radial direction with respect to the centerline of the inner rail.

Aspect 2: A conveyor according to aspect 1, wherein the line along which the resultant radial force of the conveyor line towards the centerline of the inner rail acts intersects a centerline of the conveyor line, such that the upper contact location between the guide roller and the inner rail where the guide roller is radially supported lies above the centerline of the conveyor line as seen in a cross-sectional plane of the helical track in which the centerline of the inner rail lies.

Aspect 3: A conveyor according to aspect 1 or 2, wherein the guide roller is cylindrical and the inner rail has a trough-shape including a bottom between a lower sidewall and an upper sidewall, which bottom supports the guide roller in radial direction from the centerline of the inner rail.

Aspect 4: A conveyor according to aspect 3, wherein the guide roller of each slat and the inner rail are arranged such that the upper contact location is a point contact at the bottom adjacent to the upper sidewall.

Figure 12:
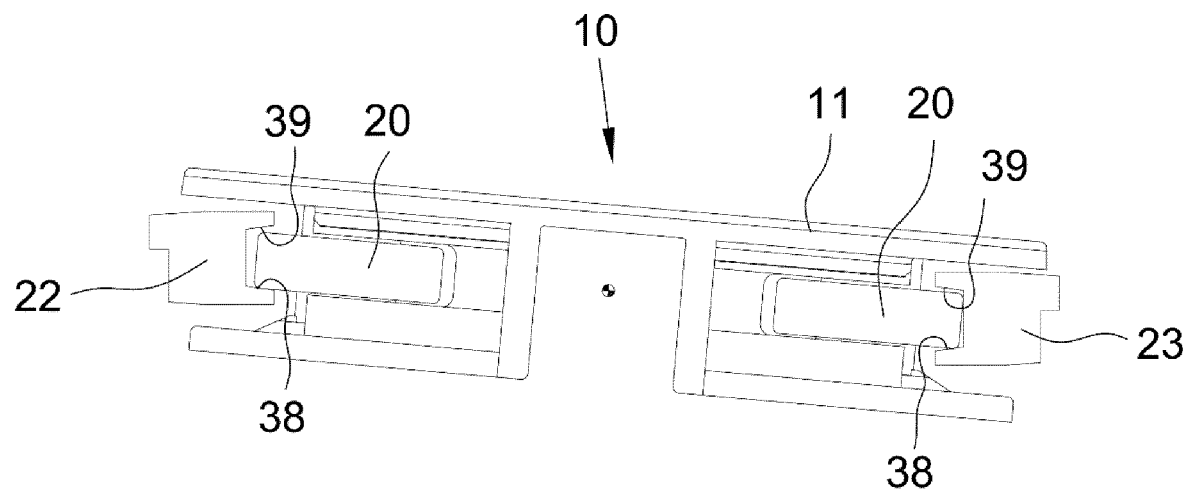
FIG. 12 is a cross-sectional view of the conveyor belt at one of the bridges.
Figure 13:
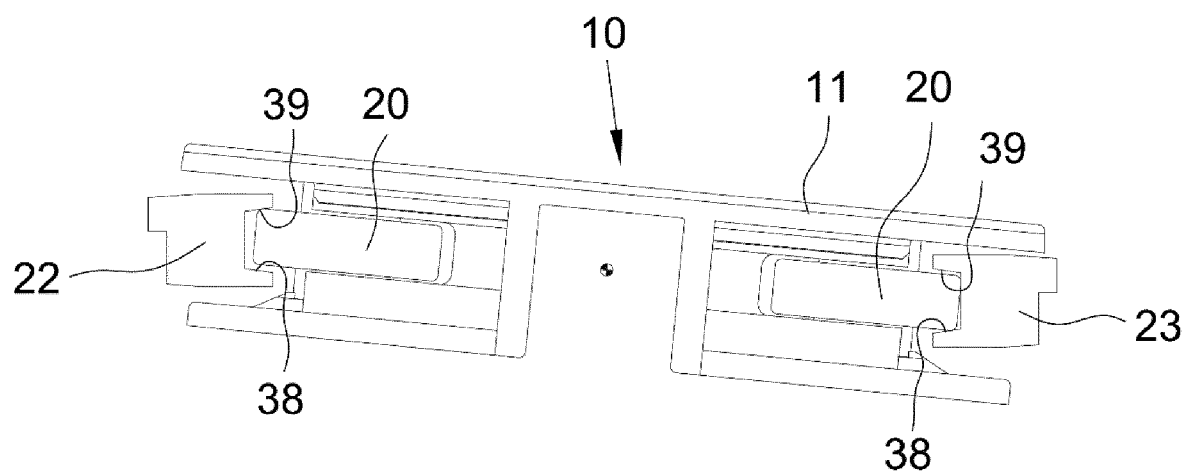
FIG. 13 is a similar view as FIG. 12, but showing a different condition.

FIGS. 12 and 13 show the conveyor belt 10 within the lower bridge 8. It can be seen that both guide rollers 20 of each slat 11 are accommodated in the respective trough-shaped inner and outer guides 22, 23 of the lower bridge 8. This is also the case at the upper bridge 9. The height levels of the inner and outer guides 22, 23 are different in order to create a banking angle. FIG. 12 illustrates one of the slats 11 in a normal situation in which both guide rollers 20 rest on respective lower sidewalls 38 of the inner and outer guides 22, 23. If the guide roller 20 at the outer guide 22 lifts from its lower sidewall 38, for example caused by excessive traction in the conveyor belt 10, it is stopped by an upper sidewall 39 of the outer guide 22.

The angle between the lower sidewall 38 and the upper sidewall 39 of each of the inner and outer guides 22, 23 is relatively small, for example between 10 and 20°, in order to limit the tilting range of the slats 11 within the inner and outer guides 22, 23. This is illustrated in FIG. 13. Furthermore, if the conveyor belt 10 is in a condition without traction it may move in outward direction within a bend such that the guide rollers 20 shift in transverse direction of the conveyor belt 10 on the lower sidewalls 38 of the inner and outer guides 23. In case of FIG. 12 this would be a displacement to the left, which leads to a larger banking angle. Due to the relatively small angles between the respective lower and upper sidewalls 38, 39 the maximum variation of the banking angle is limited.

The relatively small angles between the respective lower and upper sidewalls 38, 39 is not necessarily related to other features of the accumulating conveyor as shown in the figures and described herein. In other words, the invention is also related to the following aspect:

An accumulating conveyor, comprising a first helical track and a second helical track including coincident centerlines, a first S-shaped bridge and a second S-shaped bridge, each having a first bend in one direction and a second bend in opposite direction as seen from above, a first set of auxiliary guides and a second set of auxiliary guides and an endless conveyor belt which is drivable in a direction of conveyance, wherein the conveyor belt is guidable by said first and second helical tracks, bridges and sets of auxiliary guides such that under operating conditions the conveyor belt successively follows the first helical track from a lower end thereof in upward direction to a location below an upper end thereof, the first bridge to a location at the second helical track below an upper end thereof, the second helical track in downward direction to a lower end thereof, the first set of auxiliary guides to the upper end of the second helical track, the second helical track in downward direction, the second bridge to the first helical track, the first helical track in upward direction to the upper end thereof, and the second set of auxiliary guides to the lower end of the first helical track, wherein the bridges are at least partly located at a common inner side of the first and second helical tracks and synchronously movable along the first and second helical tracks for varying the effective lengths of the conveyor belt between the lower ends of the first and second helical tracks via the first bridge, on the one hand, and between the upper ends of the first and second helical tracks via the second bridge, on the other hand, wherein the conveyor belt comprises slats that are mounted to a flexible conveyor line, such as a side-bow chain, wherein each of the slats is provided with two guide rollers at a distance from each other in transverse direction of the conveyor belt and each having an axis of rotation including a vertical component, wherein the first and second bridges are each provided with inner and outer guides for guiding the respective guide rollers, wherein each of the inner and outer guides has a trough-shape including a lower sidewall, an upper sidewall and a bottom between the lower and upper sidewalls, wherein the lower and upper sidewalls diverge as seen from the bottom, wherein at least one of the lower and upper sidewalls has a diverging angle with respect to the bottom which is smaller than 110°, preferably smaller than 1000.

It is noted that the inner rails 6a, 7a may also have a trough shape for upwardly, downwardly and radially supporting the guide rollers 20 of the conveyor belt 10, but the angle between the diverging walls of the trough shapes may be larger than in case of the inner and outer guides 22, 23 of the bridges 8, 9, for example 40°. The diverging angles of the inner rails 6a, 7a are less critical than in case of the bridges 8, 9 in terms of banking variation since the radii of the inner rails 6a, 7a are relatively large such that the effect of a banking variation on the maximum allowable speed of conveyor belt 10 is limited compared to the bridges 8, 9.

Figure 14:
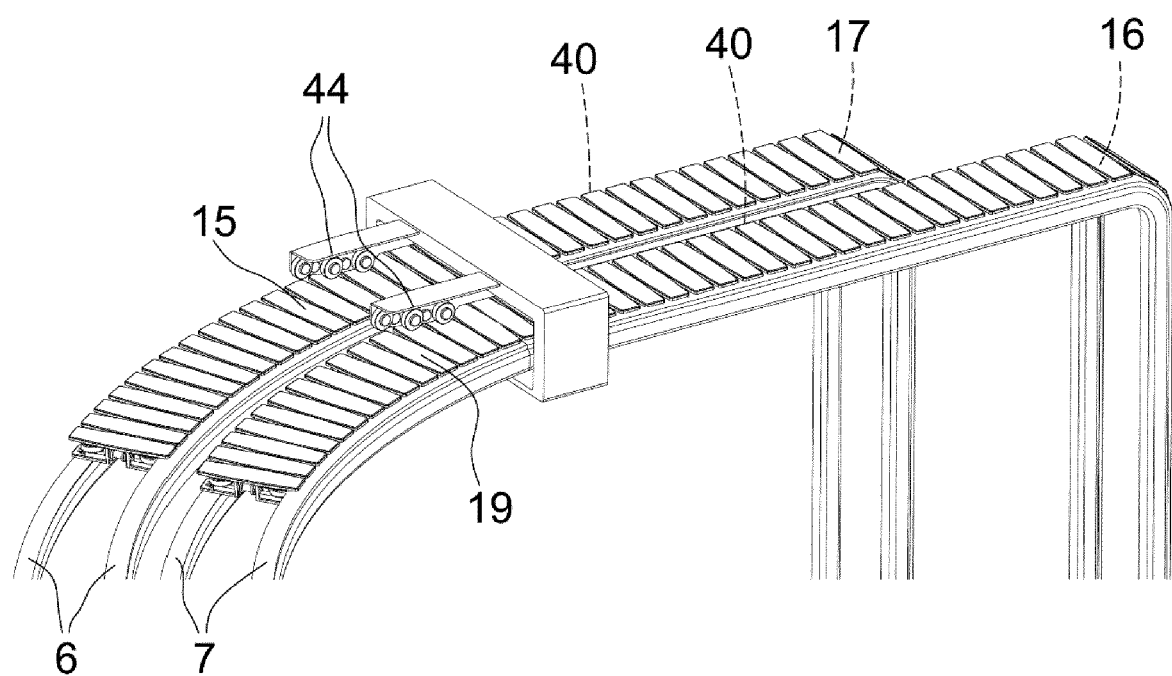
FIG. 14 is a similar view as FIG. 1, showing a part thereof on a larger scale.
Figure 15:
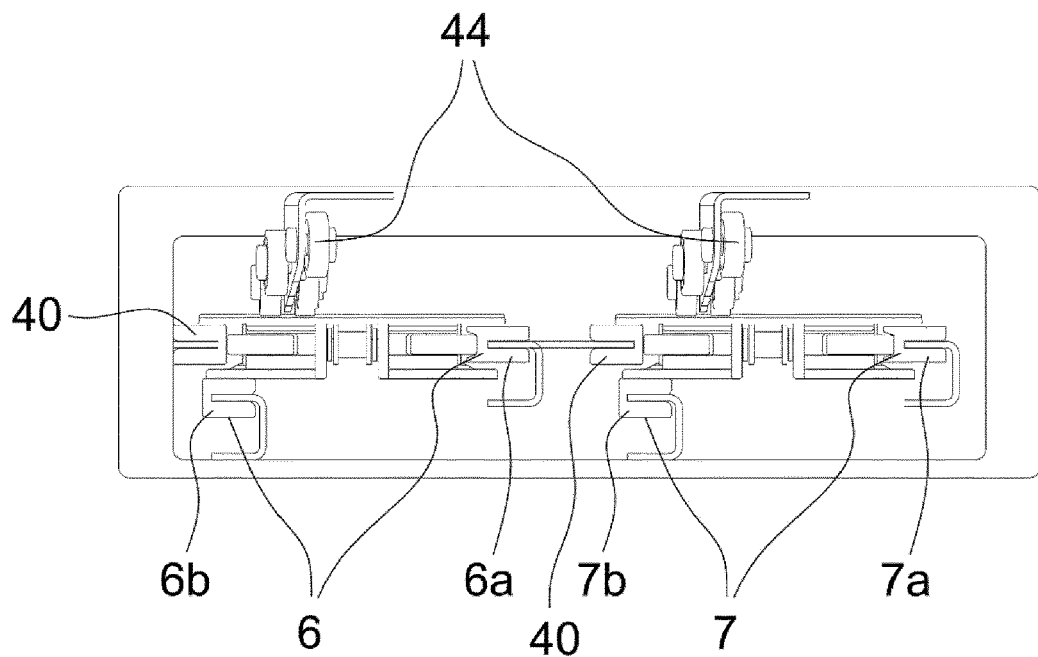
FIG. 15 is a sectional view of the part as shown in FIG. 14.

FIGS. 14 and 15 show an upper side of the accumulating conveyor 1 in more detail. At the upper ends 15, 19 of the inner and outer helical tracks 6, 7 the accumulating conveyor 1 is provided with two outer rail guides 40 to guide the slats 11 at respective transfers between the outer rails 6b, 7b and the sprockets 16, 17 at the upper side of the accumulating conveyor 1 in order to avoid displacement of the conveyor belt 10 in outward direction of the inner and outer helical tracks 6, 7. Before the conveyor belt 10 approaches one of the outer rail guides 40 it must rest on the corresponding outer rail 6b, 7b in order to avoid that a portion of one of the slats 11 collides against the corresponding rail guide 40. This is guaranteed by the presence of two series of converging rollers 44 above the conveyor belt 10, see FIG. 14. In fact, only one series of converging rollers 44 is necessary for addressing the mentioned risk, depending on the direction of conveyance of the conveyor belt 10, but both series may be applied in case the conveyor belt 10 is also driven in opposite direction.

Figure 16:
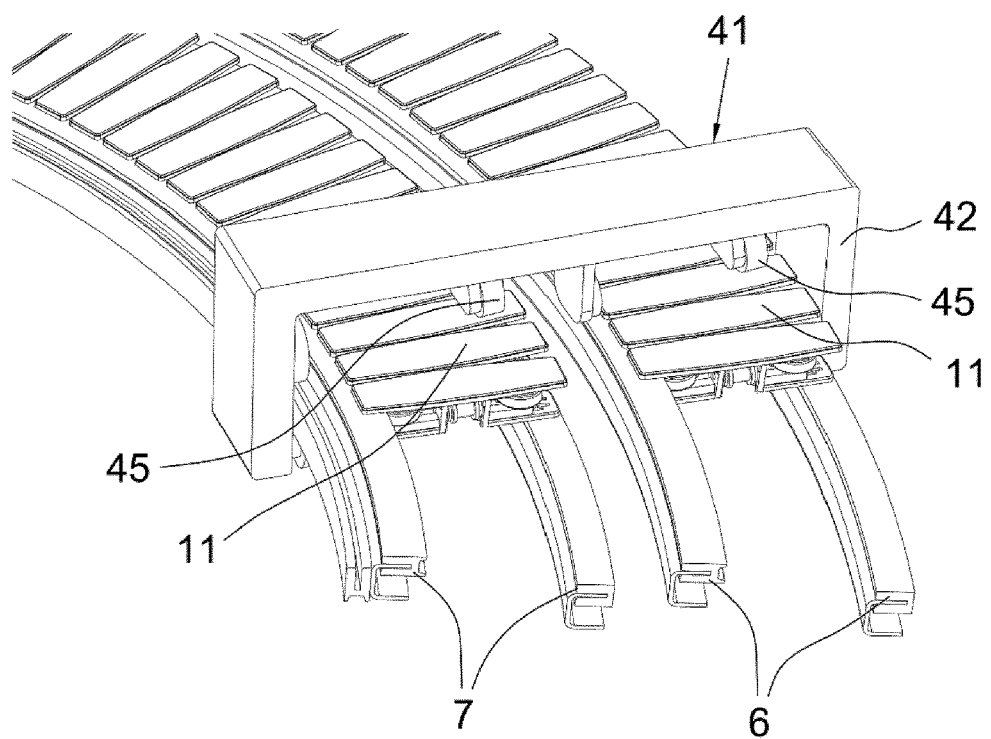
FIG. 16 is a similar view as FIG. 1, showing a part thereof on a larger scale.
Figure 17:
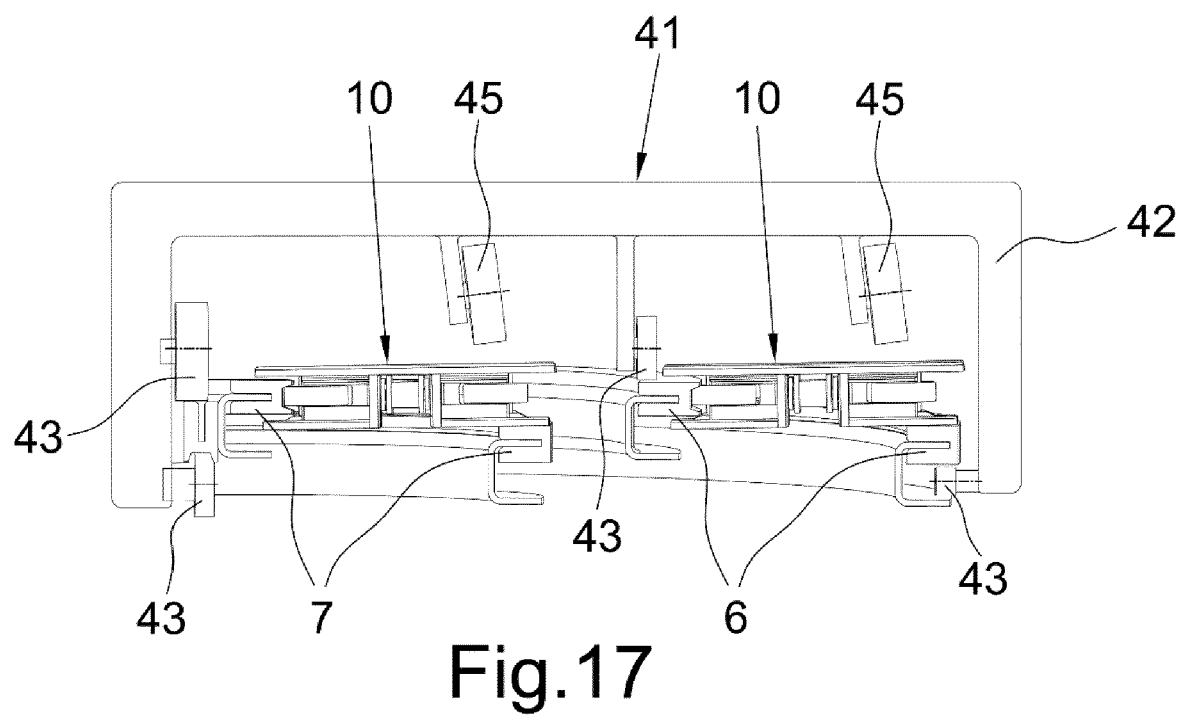
FIG. 17 is a sectional view of the part as shown in FIG. 16.

FIGS. 16 and 17 show a protection carriage 41 which is suitable for preventing the conveyor belt 10 from a complete derailment in the event that the conveyor belt 10 unexpectedly derails at an upper side of the accumulating conveyor 1, for example caused by excessive traction in the conveyor belt 10. In particular in case of a small accumulation region the distance of the conveyor belt 10 along the outer helical track 6 between the upper bridge 9 and the upper end 15 of the outer helical track 6 is relatively long, which results in a relatively high traction in the conveyor belt 10 in the upper portion of the outer helical track 6 adjacent to the sprocket 17, hence causing a risk of derailment due to tilting of the conveyor belt 10 about the inner rail 6a of the outer helical track 6.

The protection carriage 41 has a U-shaped frame 42 which freely runs along the inner and outer helical tracks 6, 7 through carriage rollers 43. Under normal operating conditions when the lower and upper bridges 8, 9 are at a relatively low position, the protection carriage 41 is located at a distance of a half winding, for example, from the upper ends 15, 19 of the inner and outer helical tracks 6, 7 where it abuts a stop element (not shown) to prevent the protection carriage 41 from running further downwardly. Such a location is illustrated in FIG. 1. However, the distance may be different. When a large accumulation region is required the upper bridge 9 will push the protection carriage 41 upwardly along the inner and outer helical tracks 6, 7 beyond the stop element until it is stopped at the upper ends 15, 19 of the first and second helical tracks 6, 7.

The functioning of the protection carriage 41 is as follows: when the upper and lower bridges 8, 9 are at a relatively low height position and the conveyor belt 10 unexpectedly derails at a location above the upper bridge 9, for example at the upper end 15 of the outer helical track 6, this will be detected by sensors (not shown) and the motors 13, 14 will be switched-off immediately. In order to avoid that derailment will progress downwardly along the inner and outer helical tracks 6, 7 like a chain reaction the protection carriage 41 limits the length of derailment by the wheels 45 inside the frame 42 of the protection carriage 41. The wheels 45 prevent the cooperating slat 11 from tilting about the inner rails 6a, 7a. If the protection carriage 41 is located a half winding from the upper ends 15, 19 of the inner and outer helical tracks 6, 7, for example, the derailment is limited to that distance.

The protection carriage is not necessarily related to other features of the accumulating conveyor as shown in the figures and described herein. In other words, the invention is also related to the following aspects:

Aspect 1: An accumulating conveyor, comprising a first helical track and a second helical track including coincident centerlines, a first S-shaped bridge and a second S-shaped bridge, each having a first bend in one direction and a second bend in opposite direction as seen from above, a first set of auxiliary guides and a second set of auxiliary guides and an endless conveyor belt which is drivable in a direction of conveyance, wherein the conveyor belt is guidable by said first and second helical tracks, bridges and sets of auxiliary guides such that under operating conditions the conveyor belt successively follows the first helical track from a lower end thereof in upward direction to a location below an upper end thereof, the first bridge to a location at the second helical track below an upper end thereof, the second helical track in downward direction to a lower end thereof, the first set of auxiliary guides to the upper end of the second helical track, the second helical track in downward direction, the second bridge to the first helical track, the first helical track in upward direction to the upper end thereof, and the second set of auxiliary guides to the lower end of the first helical track, wherein the bridges are at least partly located at a common inner side of the first and second helical tracks and synchronously movable along the first and second helical tracks for varying the effective lengths of the conveyor belt between the lower ends of the first and second helical tracks via the first bridge, on the one hand, and between the upper ends of the first and second helical tracks via the second bridge, on the other hand, wherein each of the first and second helical tracks is provided with an inner rail and an outer rail surrounding the inner rail, wherein the conveyor belt is upwardly, downwardly and radially supported by the inner rail and upwardly supported by the outer rail and movable in upward direction with respect to the outer rail, wherein the accumulating conveyor is provided with a protection carriage which is freely movable along at least one of the first helical track and the second helical track between the upper end thereof and a stop element at a distance of the upper end thereof, wherein the protection carriage comprises a holding member located above the conveyor belt at the protection carriage for minimizing lifting of the conveyor belt from the outer rail, wherein the second bridge and the protection carriage are provided with cooperating engagement elements which are adapted such that the second bridge can push the protection carriage upwardly along said at least one of the first and second helical tracks. The cooperating engagement elements may be simple contact surfaces at the protection carriage and the upper bridge. This function of the protection carriage can be considered as a damage control system. If an overload of the conveyor belt occurs the top half winding, for example, may derail in a controlled manner providing instant belt tension release. The holding member may be located above the conveyor belt at the outer rail of the first helical track only if the direction of conveyance is always the same.

Aspect 2: A conveyor according to aspect 1, wherein a driving motor for driving the conveyor belt is located at the second set of auxiliary guides and the protection carriage is located at the first helical track. In this case the driving motor generates a relatively high traction in the conveyor belt at the first helical track which forms the highest risk of derailment.

Aspect 3: A conveyor according to aspect 1 or 2, wherein the protection carriage is located at the first and second helical tracks and the holding member is located above the conveyor belt at both the first and second helical tracks.

Figure 18:
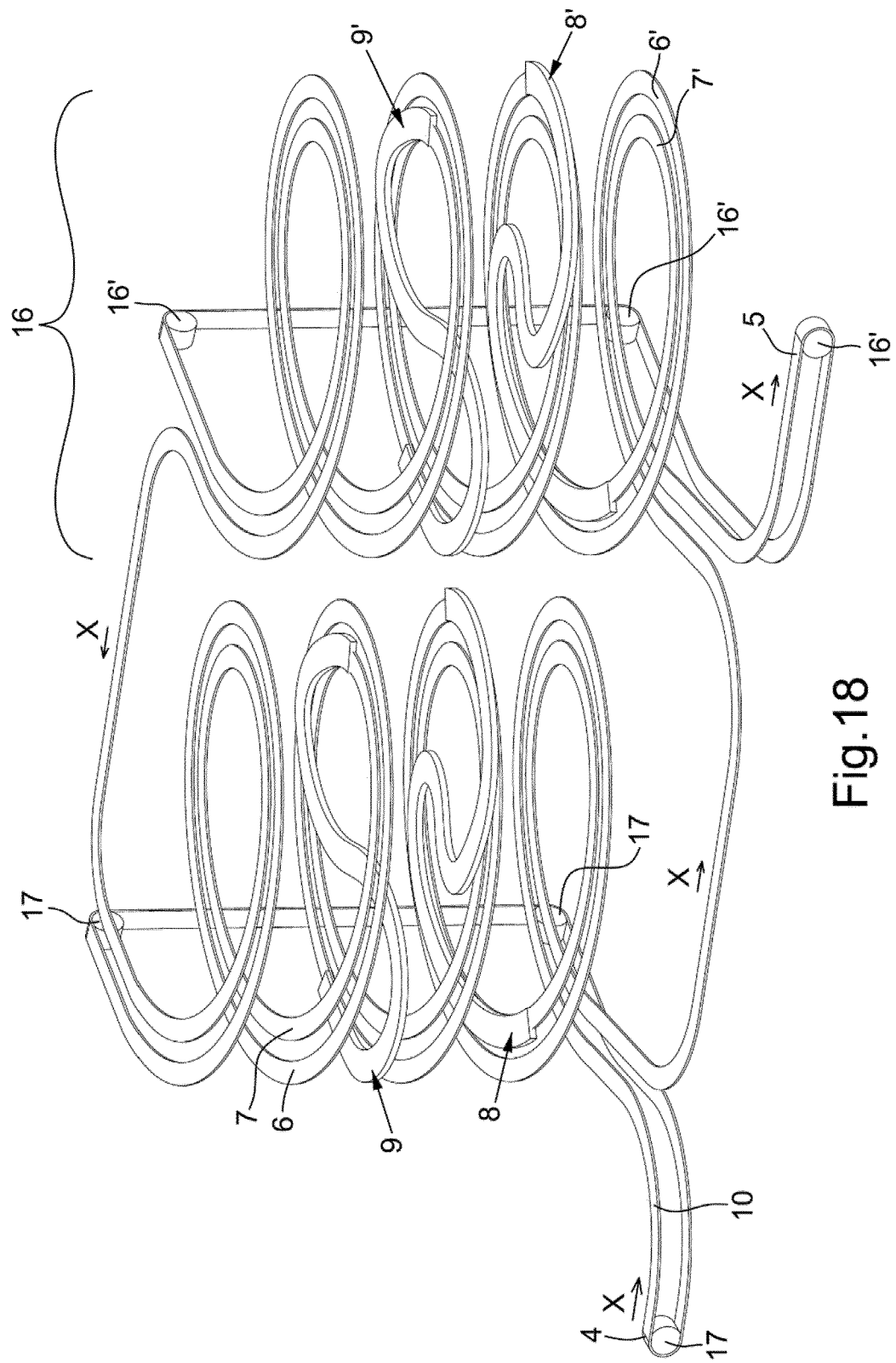
FIG. 18 is a similar view as FIG. 1 of an alternative embodiment.
Figure 19:
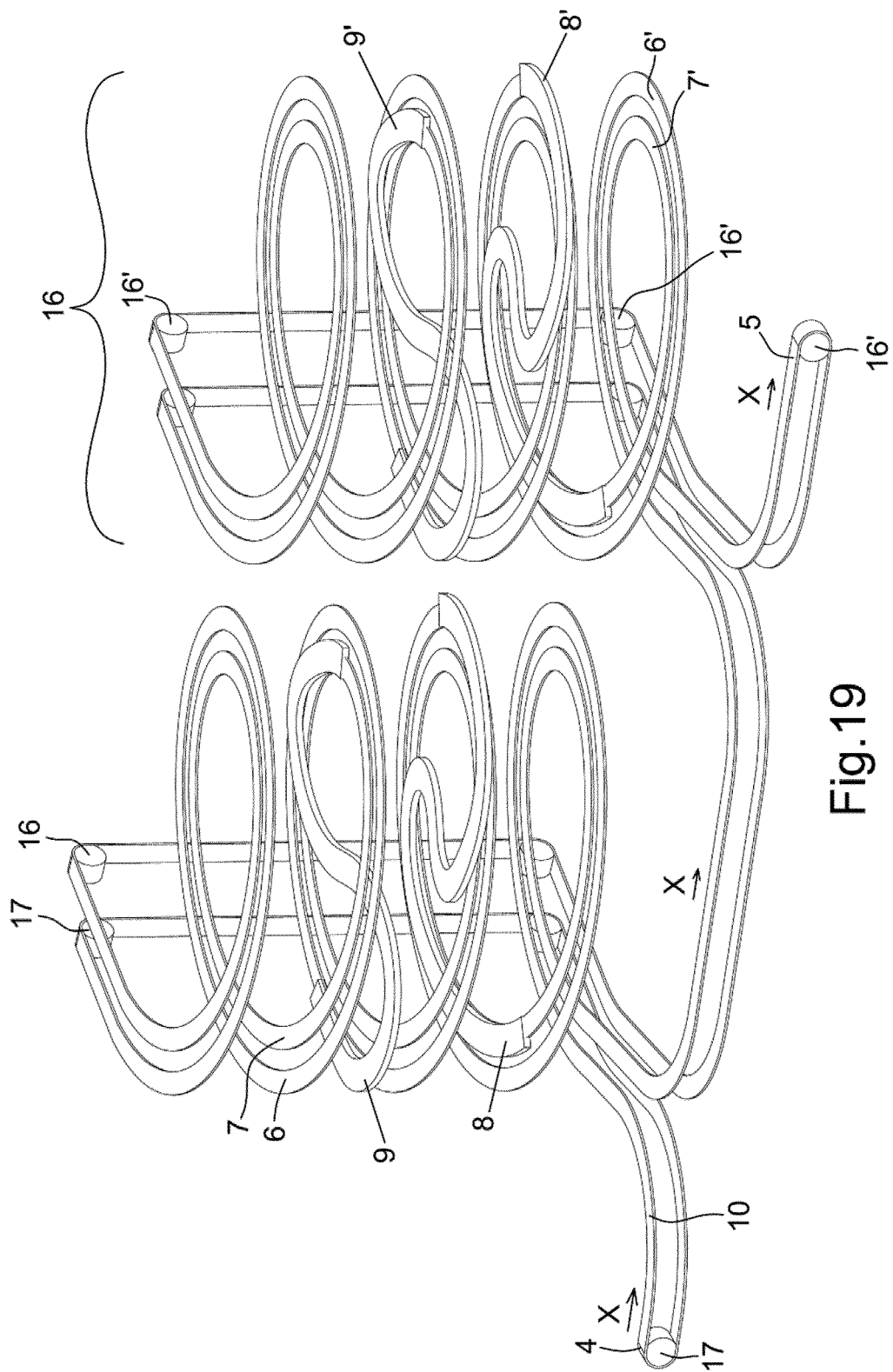
FIG. 19 is a similar view as FIG. 18, showing another variant.

FIG. 18 shows an embodiment in which two accumulating conveyors 1 are arranged in series. Compared to the embodiment as shown in FIG. 1 the left part of the embodiment of FIG. 18 can be considered as comprising the first and second helical tracks 6, 7, the first and second bridges 8, 9 and the second set of auxiliary guides 17, whereas the right part can be considered as comprising the first set of auxiliary guides 16. In this case the first set of auxiliary guides 16 comprise additional first and second helical tracks 6', 7' and additional first and second bridges 8', 9' which function in a similar way as the left part of the embodiment as shown in FIG. 18. The accumulation region extends from the product inlet 4 via the first bridge 8 of the left part, the additional first bridge 8' of the right part to the product outlet 5. Due to this arrangement the speed of the conveyor belt 10 between the first bridge 8 of the left part and the additional first bridge 8' of the right part is half of the speed of the conveyor belt 10 at the product outlet 5 when the speed of the conveyor belt 10 at the product inlet 4 is zero. The same effect occurs if the speed at the product outlet 5 is zero whereas the speed at the product inlet is not zero. Due to the speed reduction less driving power is required. FIG. 19 shows an alternative embodiment, which is less preferred because of introducing a larger total length of the conveyor belt 10 in comparison to the embodiment as shown in FIG. 18.

In more general terms the invention is also related to the following aspect:

An accumulating conveyor, comprising a first helical track and a second helical track including coincident centerlines, a first S-shaped bridge and a second S-shaped bridge, each having a first bend in one direction and a second bend in opposite direction as seen from above, a first set of auxiliary guides and a second set of auxiliary guides and an endless conveyor belt which is drivable in a direction of conveyance, wherein the conveyor belt is guidable by said first and second helical tracks, bridges and sets of auxiliary guides such that under operating conditions the conveyor belt successively follows the first helical track from a lower end thereof in upward direction to a location below an upper end thereof, the first bridge to a location at the second helical track below an upper end thereof, the second helical track in downward direction to a lower end thereof, the first set of auxiliary guides to the upper end of the second helical track, the second helical track in downward direction, the second bridge to the first helical track, the first helical track in upward direction to the upper end thereof, and the second set of auxiliary guides to the lower end of the first helical track, wherein the bridges are at least partly located at a common inner side of the first and second helical tracks and synchronously movable along the first and second helical tracks for varying the effective lengths of the conveyor belt between the lower ends of the first and second helical tracks via the first bridge, on the one hand, and between the upper ends of the first and second helical tracks via the second bridge, on the other hand, wherein the first set of auxiliary guides comprises an additional first helical track and an additional second helical track including coincident centerlines, an additional first S-shaped bridge and an additional second S-shaped bridge, each having a first bend in one direction and a second bend in opposite direction as seen from above, wherein the additional bridges are at least partly located at a common inner side of the additional first and second helical tracks and synchronously movable along the additional first and second helical tracks, and an additional first set of auxiliary guides, wherein at the first set of auxiliary guides the conveyor belt successively follows from the lower end of the second helical track the additional first helical track from a lower end thereof in upward direction to a location below an upper end thereof, the additional first bridge to a location at the additional second helical track below an upper end thereof, the additional second helical track in downward direction to a lower end thereof, the additional first set of auxiliary guides to the upper end of the additional second helical track, the additional second helical track in downward direction, the additional second bridge to the additional first helical track, the additional first helical track in upward direction to the upper end thereof and from there to the upper end of the second helical track. This embodiment can be combined with features in relation to other embodiments as disclosed herein. For example, banking, different radii and inclination angles may be applied at the bridges and additional bridges. In practice the first and second helical track may be located at a distance from the additional first and second helical track.

Figure 20:
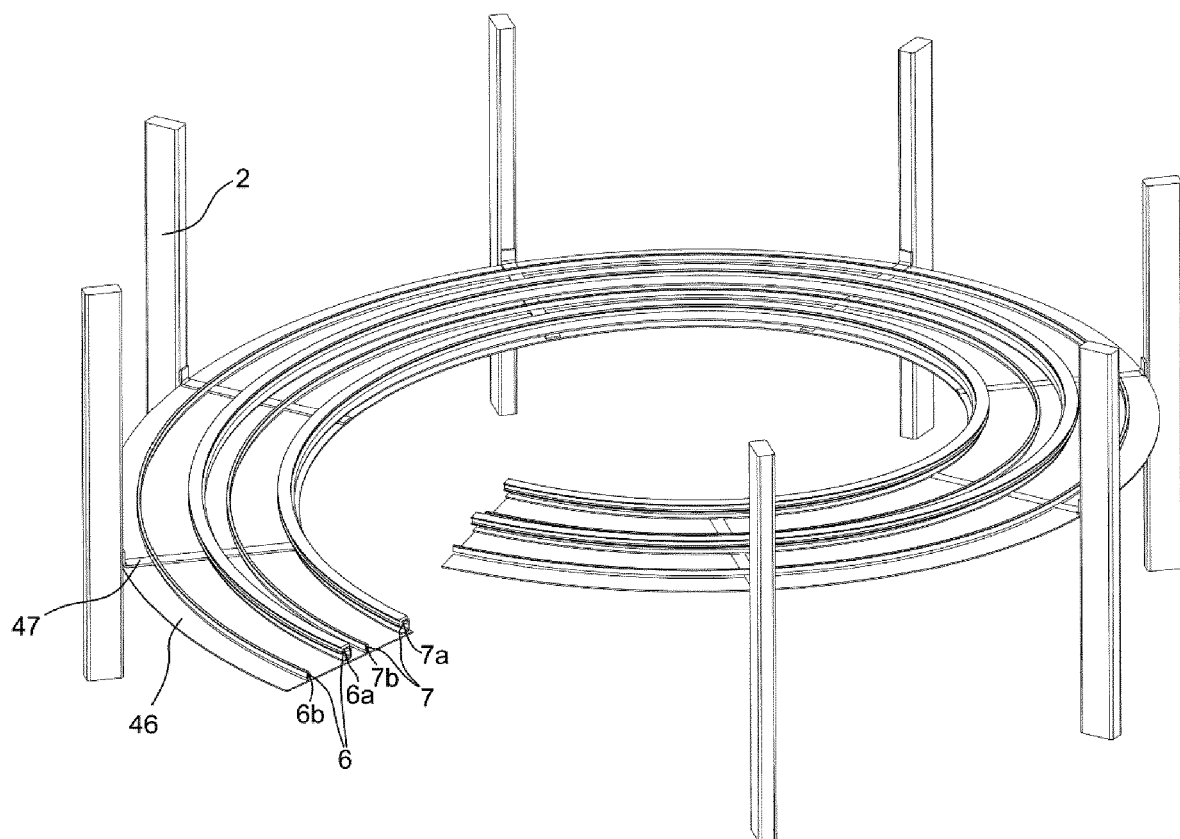
FIG. 20 is a perspective view of an embodiment of the accumulating conveyor including a helical support plate.
Figure 21:
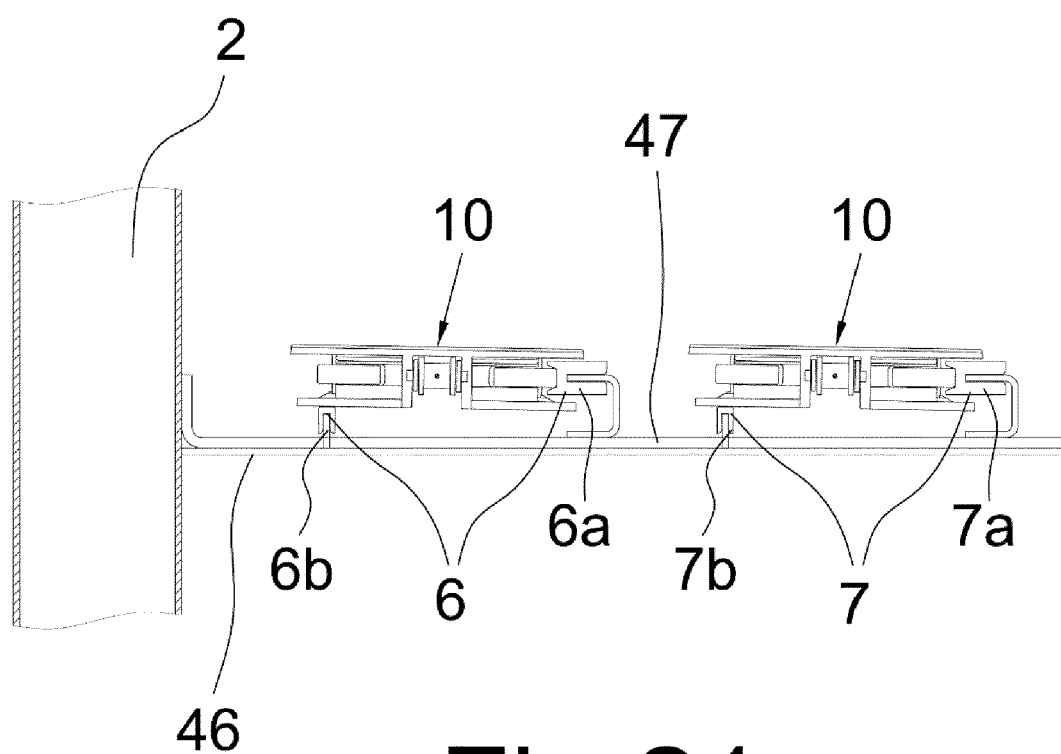
FIG. 21 is a cross-sectional view of the embodiment as shown in FIG. 20.

FIGS. 20 and 21 show another aspect of the present invention. In this case the inner and outer rails 6a, 6b, 7a, 7b are supported by a helical plate 46. This appears to create a rigid support, even in case of a relatively thin helical plate. Hence, the first and second helical tracks 6, 7 can be supported by the relatively thin helical plate 46 instead of conventional relatively thick rods, which extend radially with respect to the centerlines of the inner and outer helical tracks 6, 7 and which are arranged at angular distance with respect to each other about the centerline of the inner and outer helical tracks 6, 7. The sum of the height of the helical plate 46 and each of the inner and outer rails 6a, 6b, 7a, 7b can be minimized. The helical plate 46 may be made by deformation of a ring-shaped plate including a gap in radial direction of the ring-shaped plate, wherein end portions of the ring-shaped plate at either side of the gap are displaced with respect to each other in a direction perpendicular to the plane of the ring-shaped plate and attached to the frame 2. Due to the mentioned displacement the ring-shaped plate automatically deforms into the helical shape. FIGS. 20 and 21 show that the helical plate 46 is fixed to the frame 2 by means of flat rods 47. A number of such helical plates 46 can be mounted behind each other to form a plurality of windings.

The application of the helical plate is not necessarily related to other aspects as described in the present application. In other words, the invention is also related to the following aspects:

Aspect 1: A helical conveyor including a drivable conveyor belt which is supported and guided by a helical rail, which rail is supported by a helical plate, wherein the helical plate is fixed to a frame.

Aspect 2: A helical conveyor according to aspect 1, wherein the helical plate is made by deformation of a ring-shaped plate including a gap in radial direction of the ring-shaped plate, wherein end portions of the ring-shaped plate at either side of the gap are displaced with respect to each other in a direction perpendicular to the plane of the ring-shaped plate and attached to the frame.

In practice the helical conveyor may be provided with a plurality of such helical plates which may be fixed to each other and to the frame.

Figure 22:
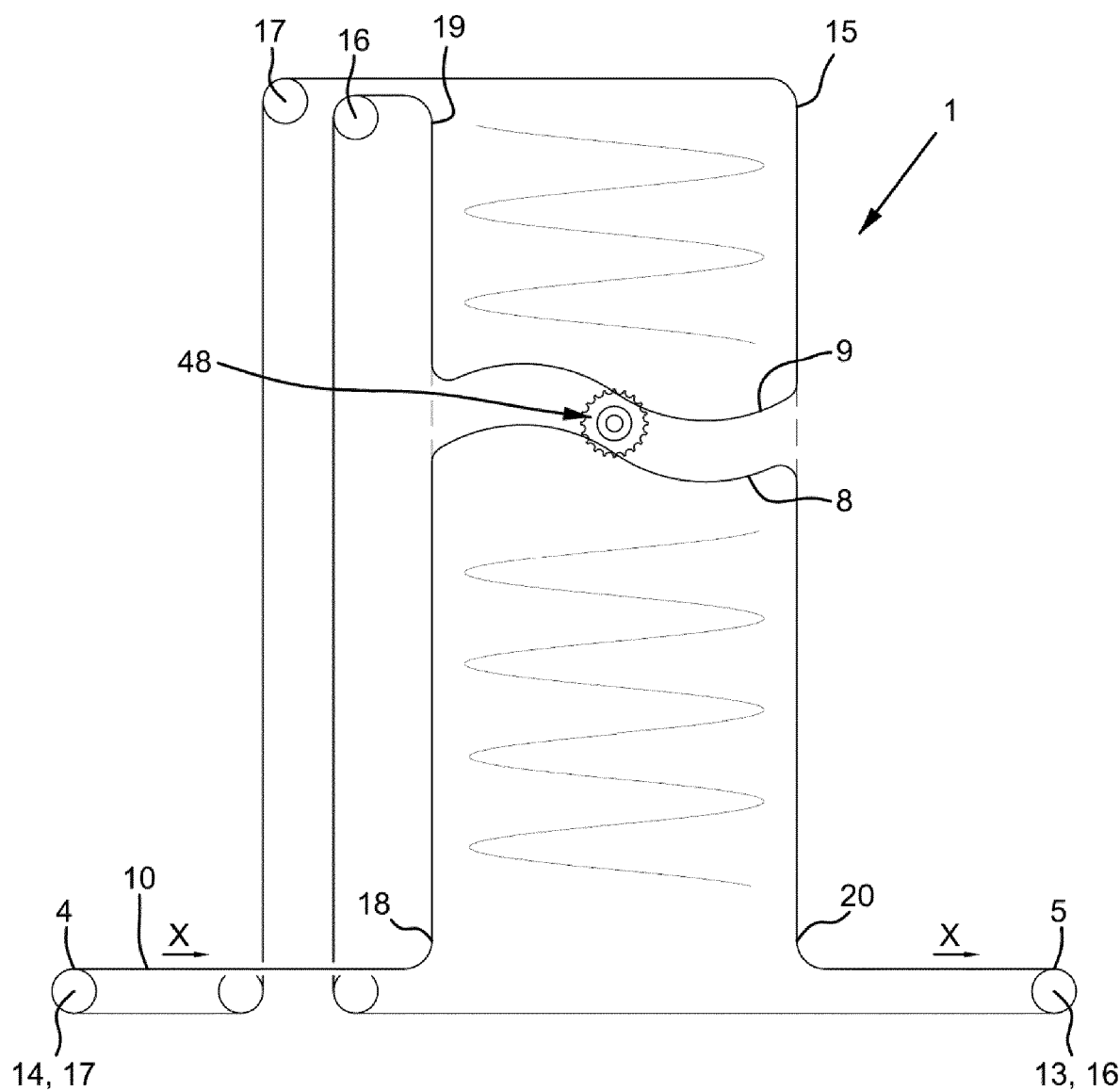
FIG. 22 is an illustrative view of an alternative embodiment of the accumulating conveyor.

FIG. 22 shows an illustrative drawing of an alternative embodiment of the accumulating conveyor 1. This embodiment is provided with a coupling 48 between respective portions of the conveyor belt 10 at the lower bridge 8 and the upper bridge 9. The coupling 48 transfers a driving force between the respective portions of the conveyor belt 10 at the respective lower and upper bridges 8, 9. In this case the coupling 48 is formed by a sprocket which engages the chain 12 of the conveyor belt 10 at the lower and upper bridges 8, 9, but alternative configurations are conceivable.

The functioning of the coupling 48 can be explained by the following example. When the lower and upper bridges 8, 9 are at a relative high level in the accumulating conveyor 1 and the electric motor 14 at the product inlet 4 pulls the conveyor belt 10, the level of traction in the conveyor belt 10 directly downstream of the product inlet 4 will be low, but will increase significantly during its travel towards the lower bridge 8 because of the pulling force of the electric motor 13 at the product outlet 5 and the relatively high number of windings along which the conveyor belt 10 travels up to the lower bridge 8. Since the conveyor belt 10 follows a helical path the required traction increases exponentially with the number of windings. On the other hand, the electric motor 14 at the product inlet 4 can exert a relatively high pulling force on the conveyor belt 10 at the upper bridge 9 because of the relatively low number of windings between the upper bridge 9 and the electric motor 14 at the product inlet 4 in this condition. Due to the presence of the coupling 48 the portion of the conveyor belt 10 at the upper bridge 9 can drive the portion of the conveyor belt 10 at the lower bridge 8 in this situation. In another situation, when the bridges 8, 9 are located at a relatively low position in the accumulating conveyor 1, the portion of the conveyor belt 10 at the lower bridge 8 may drive the portion of the conveyor belt 10 at the upper bridge 9 through the coupling 48. As a consequence, the presence of the coupling 48 can smoothen traction peaks in the conveyor belt 10.

The application of the coupling is not necessarily related to other aspects as described in the present application. In other words, the invention is also related to the following aspects:

Aspect 1: An accumulating conveyor, comprising a first helical track and a second helical track including coincident centerlines, a first S-shaped bridge and a second S-shaped bridge, each having a first bend in one direction and a second bend in opposite direction as seen from above, a first set of auxiliary guides and a second set of auxiliary guides and an endless conveyor belt which is drivable in a direction of conveyance, wherein the conveyor belt is guidable by said first and second helical tracks, bridges and sets of auxiliary guides such that under operating conditions the conveyor belt successively follows the first helical track from a lower end thereof in upward direction to a location below an upper end thereof, the first bridge to a location at the second helical track below an upper end thereof, the second helical track in downward direction to a lower end thereof, the first set of auxiliary guides to the upper end of the second helical track, the second helical track in downward direction, the second bridge to the first helical track, the first helical track in upward direction to the upper end thereof, and the second set of auxiliary guides to the lower end of the first helical track, wherein the bridges are at least partly located at a common inner side of the first and second helical tracks and synchronously movable along the first and second helical tracks for varying the effective lengths of the conveyor belt between the lower ends of the first and second helical tracks via the first bridge, on the one hand, and between the upper ends of the first and second helical tracks via the second bridge, on the other hand, wherein the conveyor is provided with a coupling between respective portions of the conveyor belt at the first bridge and the second bridge for transferring a driving force between the respective portions of the conveyor belt at the respective first and second bridges.

Aspect 2: An accumulating conveyor according to aspect 1, wherein between the first and second bends of each of the first and second bridges a straight portion is present, wherein the coupling engages the portions of the conveyor belt at the respective straight portions.

The invention is not limited to the embodiments shown in the drawings and described hereinbefore, which may be varied in different manners within the scope of the claims and their technical equivalents. For example, the direction of conveyance of the conveyor belt may be in opposite direction, whereas the product inlet and product outlet are reversed. It is also possible that the product inlet and product outlet are located at different locations than shown in the figures.

Furthermore, the accumulation region and the unoccupied region may be reversed, such that the product inlet and product outlet can be located at the upper ends of the respective inner and outer helical tracks. In this case the upper bridge forms part of the accumulation region whereas the lower bridge forms part of the unoccupied region. The functioning of the accumulating conveyor is basically the same as in the embodiments as described above and shown in the figures.

The invention claimed is:

1. An accumulating conveyor, comprising a first helical track and a second helical track including coincident centerlines, a first S-shaped bridge and a second S-shaped bridge, each having a first bend in one direction and a second bend in opposite direction as seen from above, a first set of auxiliary guides and a second set of auxiliary guides and a single endless conveyor belt which is drivable in a direction of conveyance, wherein the single conveyor belt is guidable by said first and second helical tracks, the first and second bridges and the first and second sets of auxiliary guides such that under operating conditions the single conveyor belt successively follows the first helical track from a lower end thereof in upward direction to a location below an upper end thereof, the first bridge to a location at the second helical track below an upper end thereof, the second helical track in downward direction to a lower end thereof, the first set of auxiliary guides to the upper end of the second helical track, the second helical track in downward direction, the second bridge to the first helical track, the first helical track in upward direction to the upper end thereof, and the second set of auxiliary guides to the lower end of the first helical track, wherein the first and second bridges are at least partly located at a common inner side of the first and second helical tracks and synchronously movable along the first and second helical tracks for varying the effective lengths of the single conveyor belt between the lower ends of the first and second helical tracks via the first bridge, on the one hand, and between the upper ends of the first and second helical tracks via the second bridge, on the other hand, wherein at least portions of the first and second bends of at least one of the first and second bridges bank to their insides.

2. The accumulating conveyor according to claim 1, wherein the first and second helical tracks surround each other such that the first and second helical tracks extend next to each other in radial direction with respect to their centerlines, or wherein the first and second helical tracks extend parallel to each other and are located above each other such that they lie on a common imaginary cylinder and together follow a common helical path.

3. The accumulating conveyor according to claim 1, wherein at least one of the first and second bridges has a first curved section which has a less steeper longitudinal inclination in the direction of conveyance and a smaller radius as seen from above than a second curved section thereof.

4. The accumulating conveyor according to claim 3, wherein the first and second helical tracks surround each other such that the first and second helical tracks extend next to each other in radial direction with respect to their centerlines, wherein the first curved section extends at least partially above neighbouring portions of the first and second helical tracks.

5. The accumulating conveyor according to claim 3, wherein the first bend of the at least one of the first and second bridges comprises the first curved section and the second curved section, whereas the second bend has a radius which is the same as the radius of the second curved section.

6. The accumulating conveyor according to claim 5, wherein the second bend is located downstream of the first bend.

7. The accumulating conveyor according to any claim 1, further comprising a coupling between respective portions of the single conveyor belt at the first bridge and the second bridge for transferring a driving force between the respective portions of the single conveyor belt at the respective first and second bridges.

8. The accumulating conveyor according to claim 1, wherein at least one of the first and second bridges is radially supported by at least one of the first and second helical tracks through at least a bridge roller which is provided at said at least one of the first and second bridges and which bridge roller rides on said at least one of the first and second helical tracks.

9. The accumulating conveyor according to claim 8, wherein the bridge roller is located at at least one of a bridge entrance and a bridge exit of said at least one of the first and second bridges.

10. The accumulating conveyor according to claim 1, wherein the first and second helical tracks each comprise an inner rail and an outer rail for guiding the single conveyor belt, wherein the inner and the outer rails are supported by a helical plate.

11. The accumulating conveyor according to claim 1, wherein the first and second bridges are coupled to each other through at least an elongate curved coupling element extending along at least one of the first and second helical tracks between the first and second bridges, and/or wherein two remote portions of at least one of the first and second bridges are fixed to another elongate curved coupling element extending along one of the first and second helical tracks between the two remote portions.

12. The accumulating conveyor according to claim 11, wherein at least one of the elongate curved coupling element and the other elongate curved coupling element is flexible and guided by the corresponding one of the first and second helical track.

13. The accumulating conveyor according to claim 1, wherein each of the first and second helical tracks is provided with an inner rail and an outer rail surrounding the inner rail, wherein the single conveyor belt is upwardly, downwardly and radially supported by the inner rail and upwardly supported by the outer rail and movable in upward direction with respect to the outer rail, wherein the accumulating conveyor is provided with a protection carriage which is freely movable along at least one of the first helical track and the second helical track between the upper end thereof and a stop element at a distance of the upper end thereof, wherein the protection carriage comprises a holding member located above the single conveyor belt at the protection carriage for minimizing lifting of the single conveyor belt from the outer rail, wherein the second bridge and the protection carriage are provided with cooperating engagement elements which are adapted such that the second bridge can push the protection carriage upwardly along said at least one of the first and second helical tracks.

14. The accumulating conveyor according to claim 1, wherein each of the helical tracks is provided with an inner rail and an outer rail surrounding the inner rail, wherein the single conveyor belt is provided with slats that are mounted to a flexible conveyor line, such as a side-bow chain, wherein each of the slats is provided with two guide rollers at a distance from each other in transverse direction of the single conveyor belt and each guide roller having an axis of rotation including a vertical component, wherein one of the guide rollers of each slat is upwardly, downwardly and radially supported by the inner rails and wherein a portion of each slat is upwardly supported by the outer rails and movable in upward direction with respect to the outer rails, wherein an upper contact location between each of the guide rollers and the inner rails where the guide roller is radially supported lie above a line along which a resultant radial force of the conveyor line towards the centerlines of the first and second helical tracks acts.

15. The accumulating conveyor according to claim 1, wherein the single conveyor belt comprises slats that are mounted to a flexible conveyor line, such as a side-bow chain, wherein each of the slats is provided with two guide rollers at a distance from each other in transverse direction of the single conveyor belt and each having an axis of rotation including a vertical component, wherein the first and second bridges are each provided with inner and outer guides for guiding the respective guide rollers, wherein each of the inner and outer guides has a trough-shape including a lower sidewall, an upper sidewall and a bottom between the lower and upper sidewalls, wherein the lower and upper sidewalls diverge as seen from the bottom, wherein at least one of the lower and upper sidewalls has a diverging angle with respect to the bottom which is smaller than 100°.

* * * * *